(12) United States Patent
Schiesser et al.

(10) Patent No.: US 7,090,067 B2
(45) Date of Patent: Aug. 15, 2006

(54) CONVEYOR SYSTEM WITH DISTRIBUTED ARTICLE MANIPULATION

(75) Inventors: Ricardo N. Schiesser, Grand Rapids, MI (US); Michele Vitalini, Nuremberg (DE)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/605,670

(22) Filed: Oct. 16, 2003

(65) Prior Publication Data

US 2004/0104100 A1 Jun. 3, 2004

Related U.S. Application Data

(60) Provisional application No. 60/422,028, filed on Oct. 29, 2002.

(51) Int. Cl.
B65G 43/08 (2006.01)
B65G 15/10 (2006.01)

(52) U.S. Cl. .................. 198/395; 198/444; 198/415; 198/460.1; 198/817

(58) Field of Classification Search ............... 198/394, 198/395, 444, 369.5, 370.1, 415, 371.2, 817, 198/460.1, 459.6, 459.7
See application file for complete search history.

(56) References Cited

U.S. PATENT DOCUMENTS

| | | | |
|---|---|---|---|
| 3,604,551 A | 9/1971 | Fink | |
| 3,617,033 A | 11/1971 | Ichikawa | |
| 3,841,461 A | 10/1974 | Henderson et al. | |
| 3,917,050 A | 11/1975 | Gregor | |
| 4,000,492 A | 12/1976 | Willens | |
| 4,039,074 A | 8/1977 | Maxted | |
| 4,180,943 A | 1/1980 | Smith et al. | |
| 4,634,328 A | 1/1987 | Carrell | |
| 4,944,381 A | 7/1990 | Riley | |
| 5,145,049 A * | 9/1992 | McClurkin | 198/374 |
| 5,147,023 A | 9/1992 | Meindl | |
| 5,150,781 A | 9/1992 | Deisenroth et al. | |
| 5,165,520 A | 11/1992 | Herve et al. | |
| 5,222,586 A | 6/1993 | Ydoate et al. | |
| 5,299,693 A | 4/1994 | Ubaldi et al. | |
| 5,372,238 A | 12/1994 | Bonnet | |
| 5,383,760 A * | 1/1995 | Cawley et al. | 414/791.6 |

(Continued)

FOREIGN PATENT DOCUMENTS

GB  1 465 430  2/1977

(Continued)

OTHER PUBLICATIONS

Reznik, Dan and Canny, John, "The Coulomb Pump: a Novel Parts Feeding Method Using a Horizontally-Vibrating Surface," EECS Dept., UC-Berkeley, CA 94720-1776, USA, 6 pgs.

(Continued)

Primary Examiner—Douglas Hess
(74) Attorney, Agent, or Firm—Van Dyke, Gardner, Linn & Burkhart, LLP

(57) ABSTRACT

A system and method for manipulating articles includes providing a bed having at least one conveying surface. The conveying surface is adapted to move articles in a direction of conveyance from an upstream end to a downstream end of the bed. At least one sensor is provided to determine the position of any articles on the bed. Selected articles are moved in the direction of conveyance at a speed that is generally higher than articles traveling on the bed that have yet to be manipulated and the articles are selectively rotated.

42 Claims, 13 Drawing Sheets

U.S. PATENT DOCUMENTS

| | | | |
|---|---|---|---|
| 5,393,937 A | 2/1995 | Etherington et al. | |
| 5,415,281 A | 5/1995 | Taylor et al. | 198/448 |
| 5,443,791 A | 8/1995 | Cathcart et al. | |
| 5,518,103 A * | 5/1996 | Achelpohl et al. | 198/416 |
| 5,529,756 A | 6/1996 | Brennan | |
| 5,575,378 A | 11/1996 | Billington et al. | |
| 5,638,938 A | 6/1997 | Lazzarotti et al. | 198/445 |
| 5,660,262 A * | 8/1997 | Landrum et al. | 198/411 |
| 5,678,073 A | 10/1997 | Stephenson, III et al. | |
| 5,769,204 A | 6/1998 | Okada et al. | 198/443 |
| 5,772,006 A | 6/1998 | Axmann | |
| 5,779,023 A * | 7/1998 | Hidai et al. | 198/418.1 |
| 5,918,723 A | 7/1999 | Schuitema et al. | 198/347.4 |
| 5,979,636 A * | 11/1999 | Vanacore et al. | 198/460.1 |
| 6,003,857 A | 12/1999 | Salomon et al. | 271/122 |
| 6,027,694 A | 2/2000 | Boulton et al. | |
| 6,056,107 A | 5/2000 | Schuitema et al. | 198/347.4 |
| 6,170,637 B1 | 1/2001 | Ishii | |
| 6,189,677 B1 | 2/2001 | Ruf et al. | |
| 6,250,707 B1 | 6/2001 | Dintner et al. | |
| 6,253,905 B1 | 7/2001 | Pelka | 198/456 |
| 6,259,967 B1 | 7/2001 | Hartlepp et al. | |
| 6,264,891 B1 | 7/2001 | Heyneker et al. | |
| 6,269,933 B1 | 8/2001 | Schuitema et al. | 198/446 |
| 6,390,277 B1 | 5/2002 | Pelka | 198/456 |
| 6,401,936 B1 * | 6/2002 | Isaacs et al. | 198/531 |
| 6,419,074 B1 * | 7/2002 | Rasile et al. | 198/399 |
| 6,443,292 B1 * | 9/2002 | Grund | 198/444 |
| 6,464,065 B1 * | 10/2002 | Herubel et al. | 198/460.1 |
| 6,471,044 B1 * | 10/2002 | Isaacs et al. | 198/809 |
| 6,629,018 B1 | 9/2003 | Mondie et al. | 700/228 |
| 6,694,220 B1 * | 2/2004 | Tanz | 700/226 |
| 2003/0141165 A1 | 7/2003 | Reznik et al. | 198/434 |
| 2003/0234155 A1 * | 12/2003 | Kanamori et al. | |

FOREIGN PATENT DOCUMENTS

| | | |
|---|---|---|
| GB | 2 259 900 A | 3/1993 |
| WO | WO 01/74693 A1 | 10/2001 |

OTHER PUBLICATIONS

Luntz, Jonathan E.; Messner, Wm.; and Choset, Howie, "Parcel Manipulation and Dynamics With a Distributed Actuator Array: The Virtual Vehicle," Dept. of Mech. Eng., Carnegie Mellon Univ . . 7 pgs.

* cited by examiner

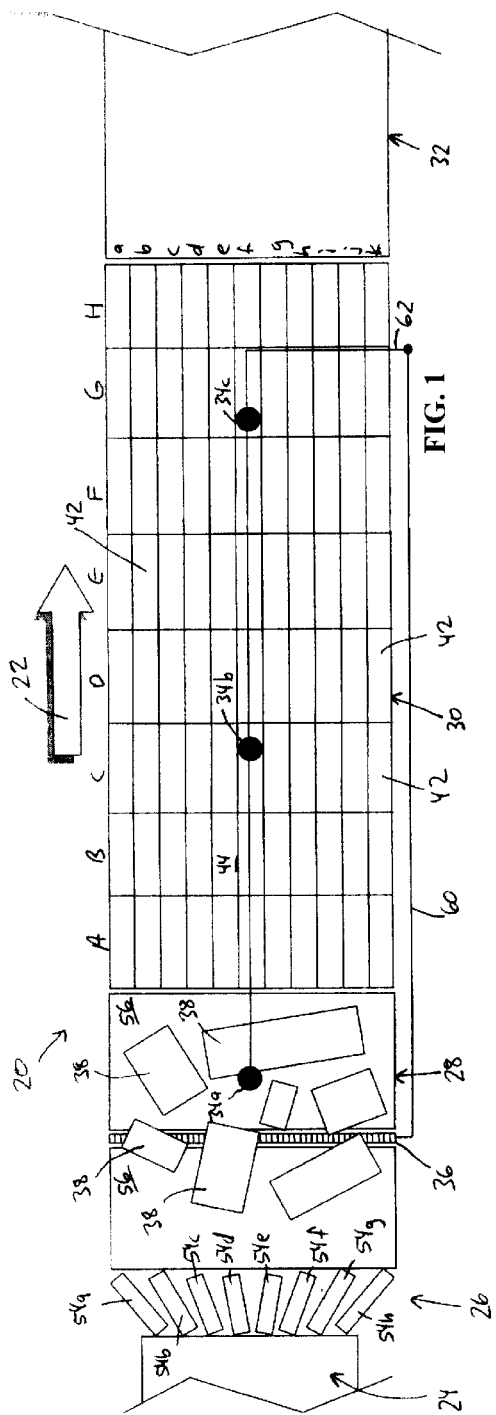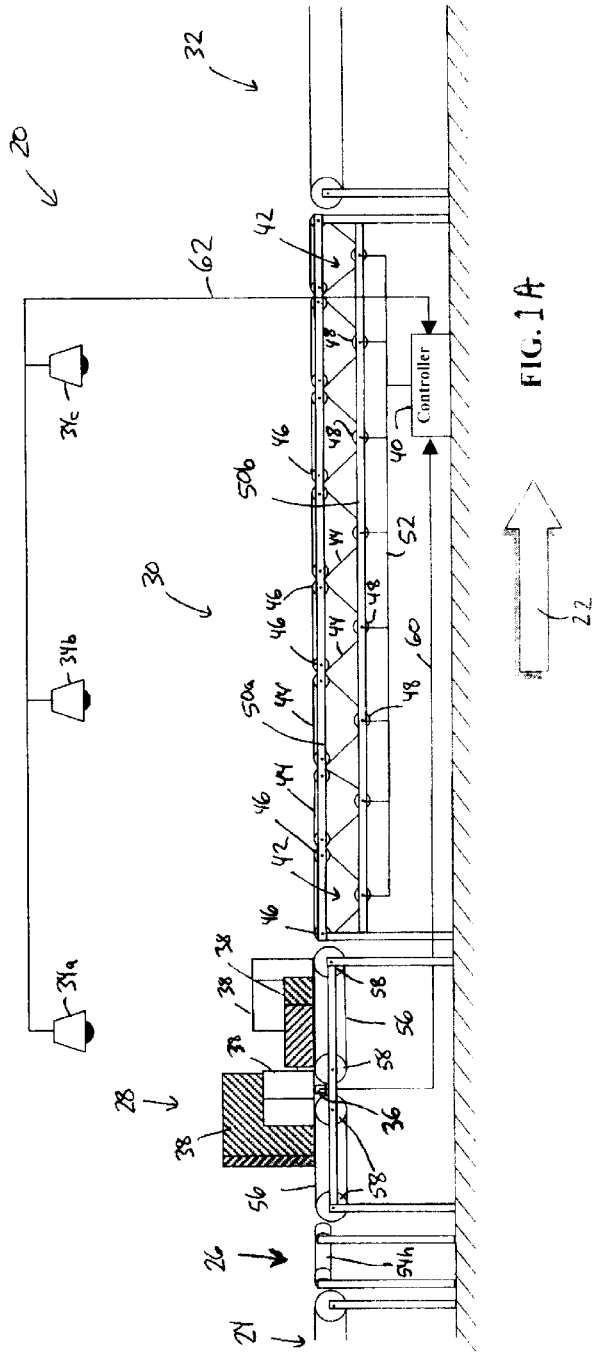

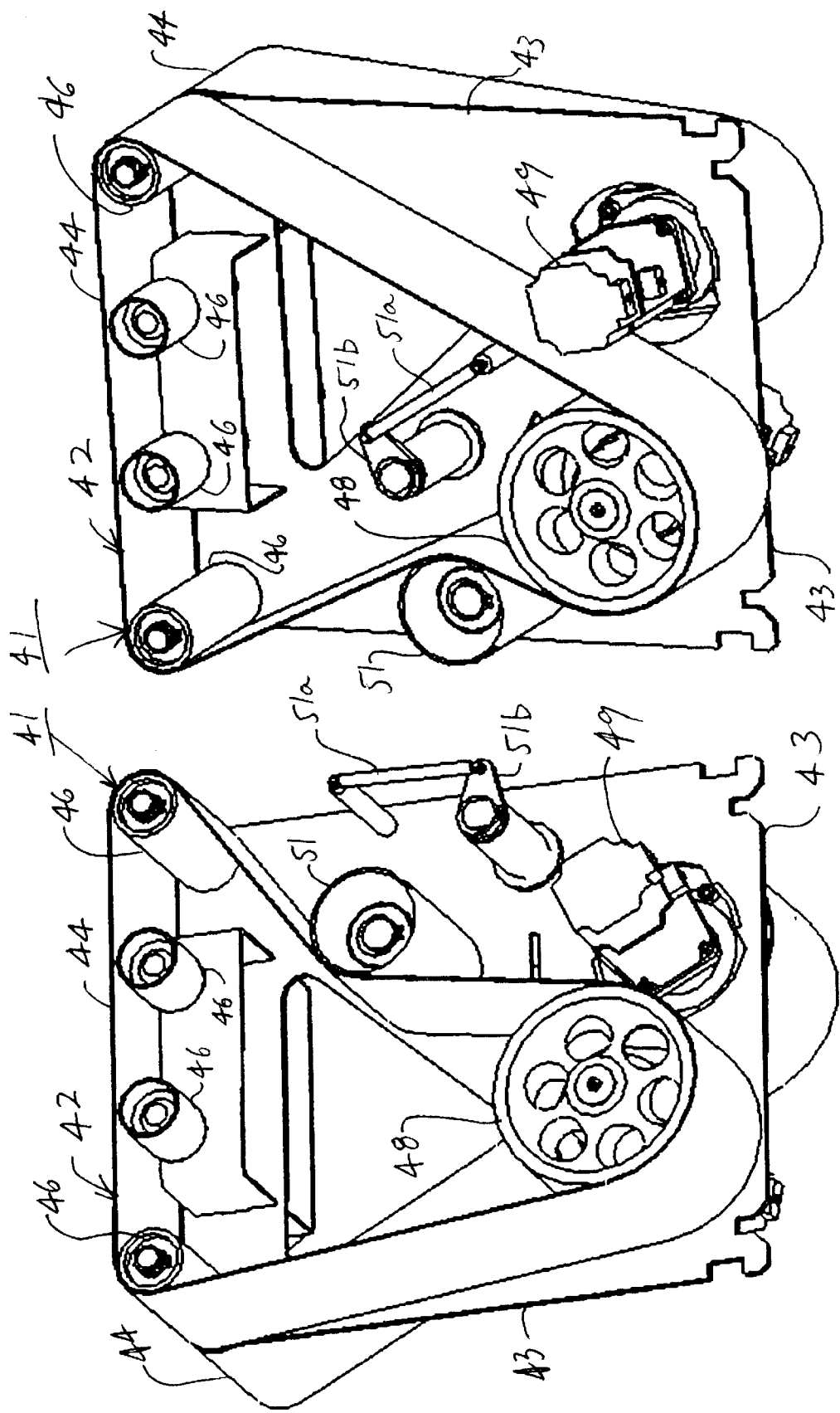

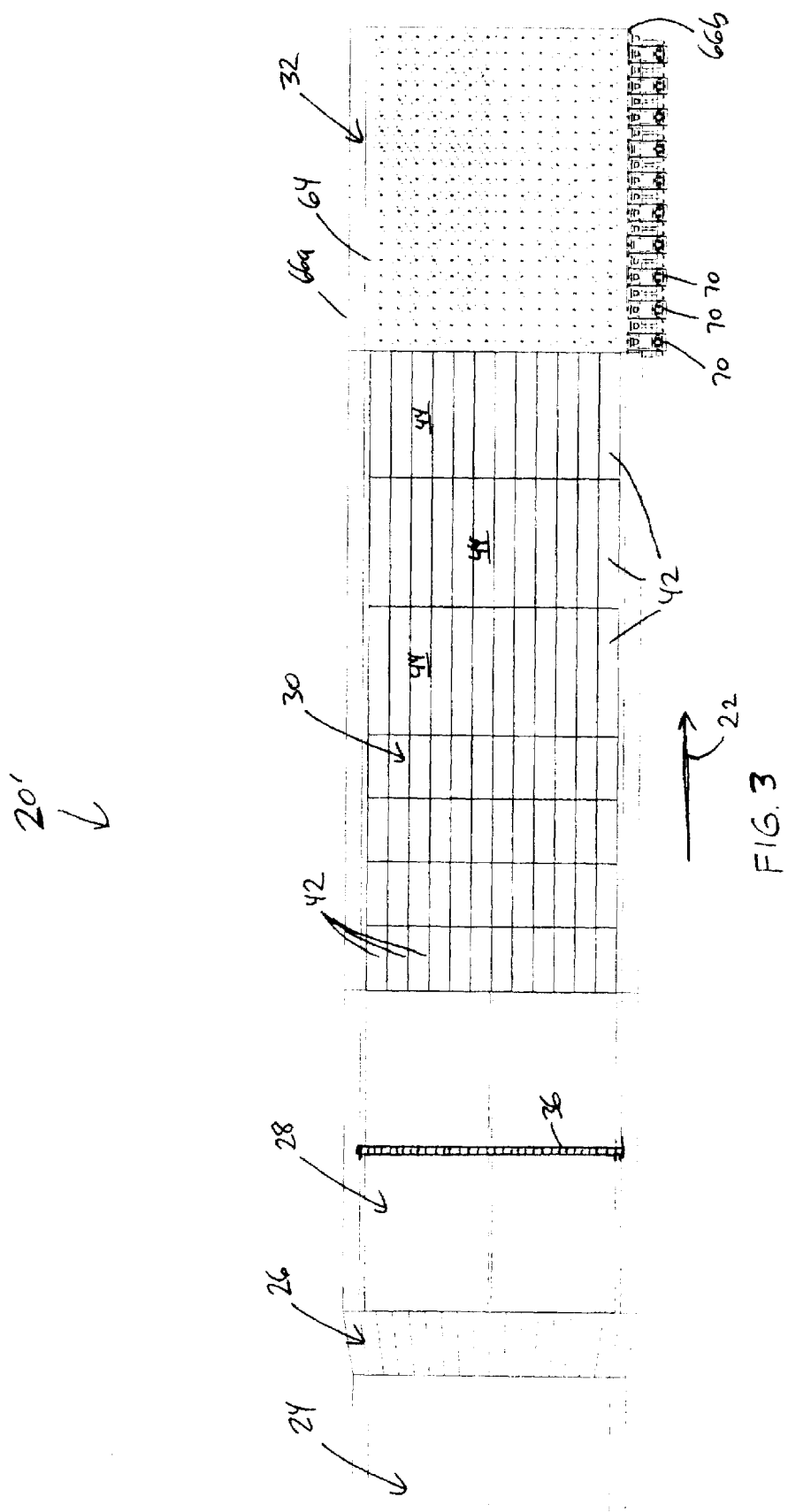

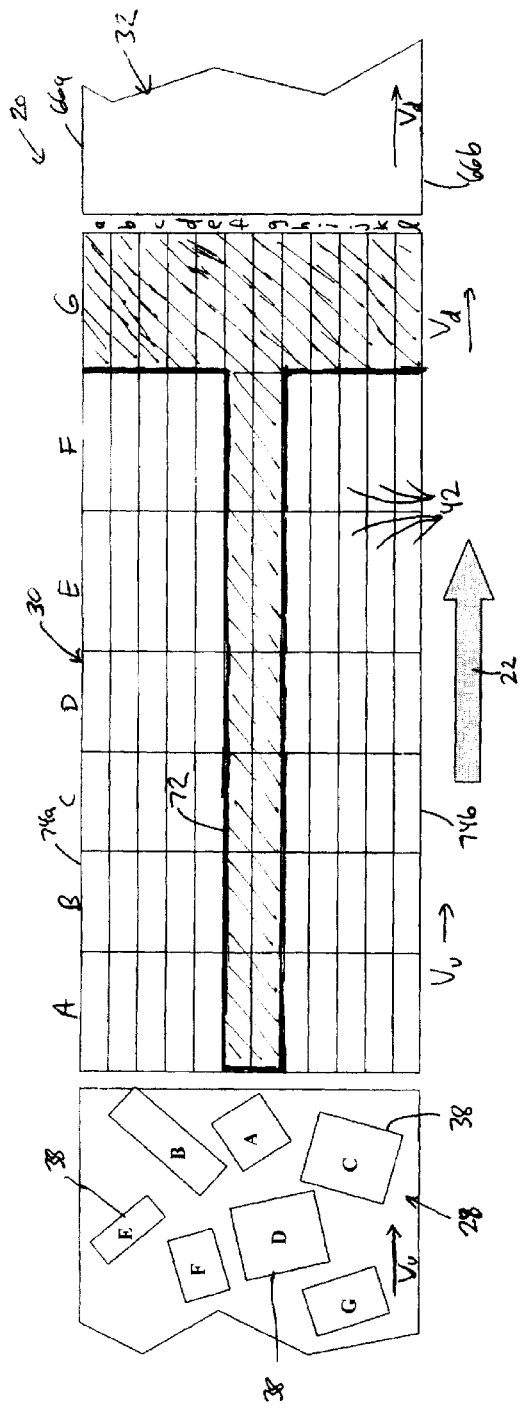
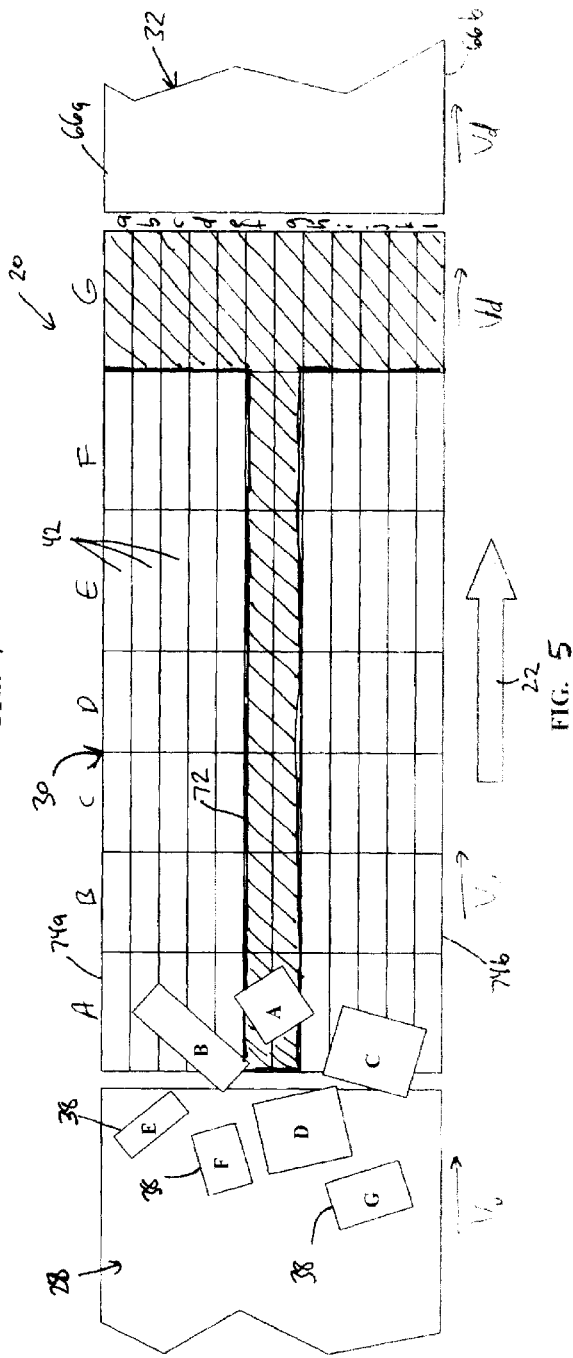
FIG. 4
FIG. 5

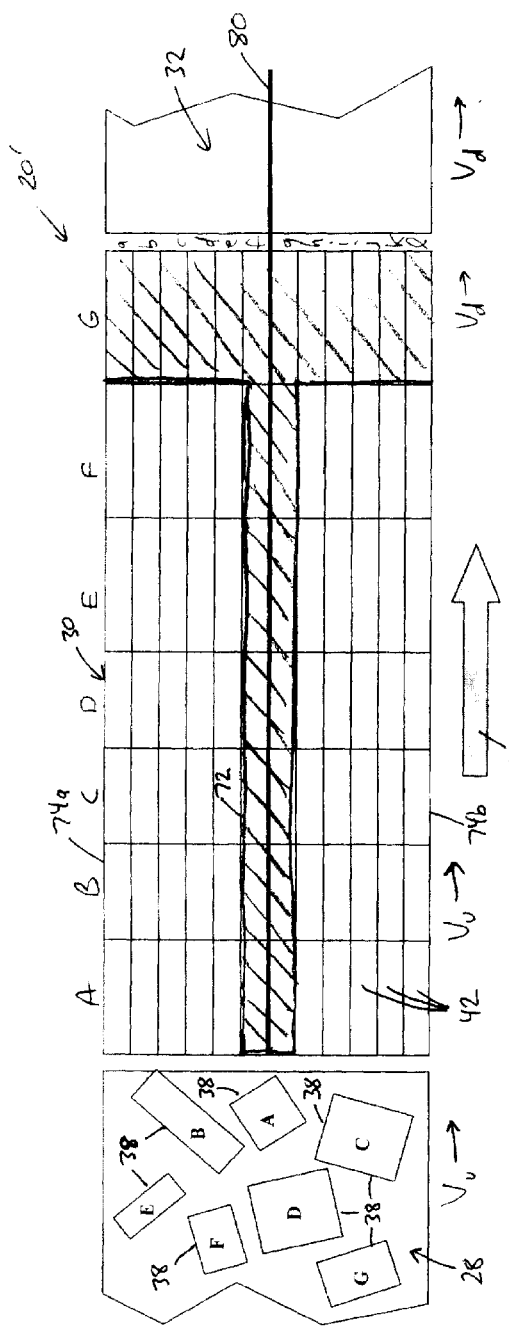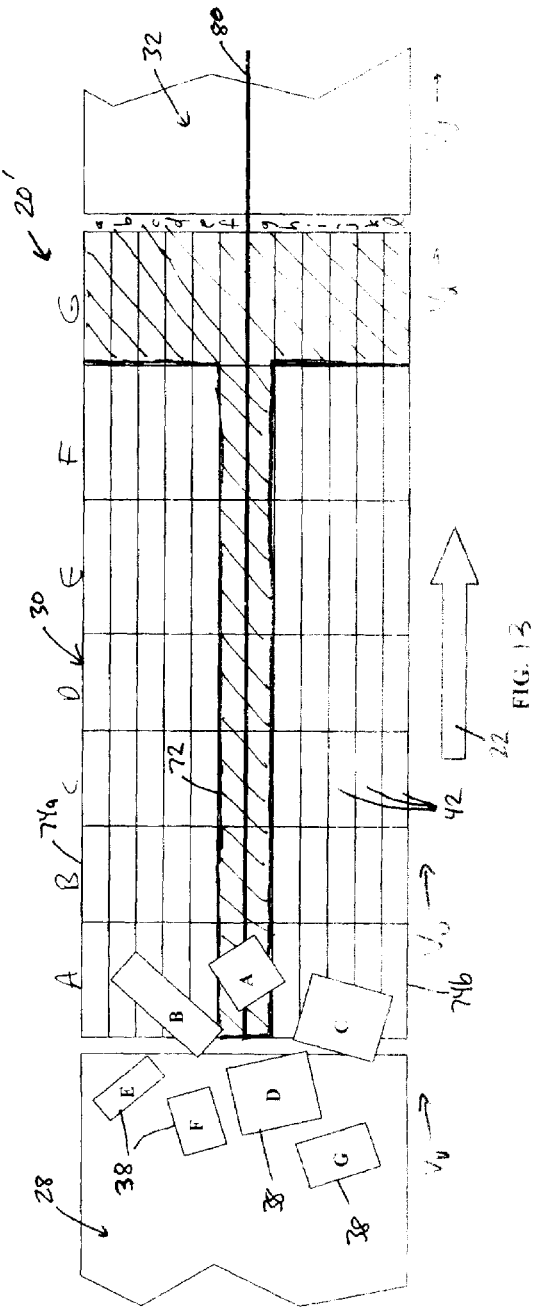
FIG. 12
FIG. 13

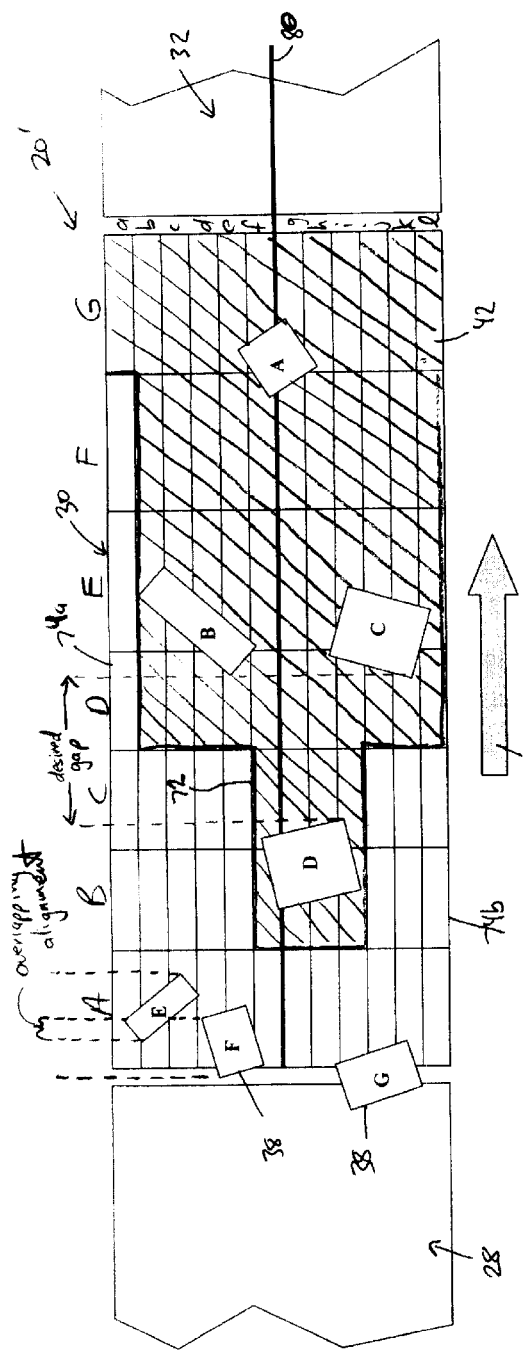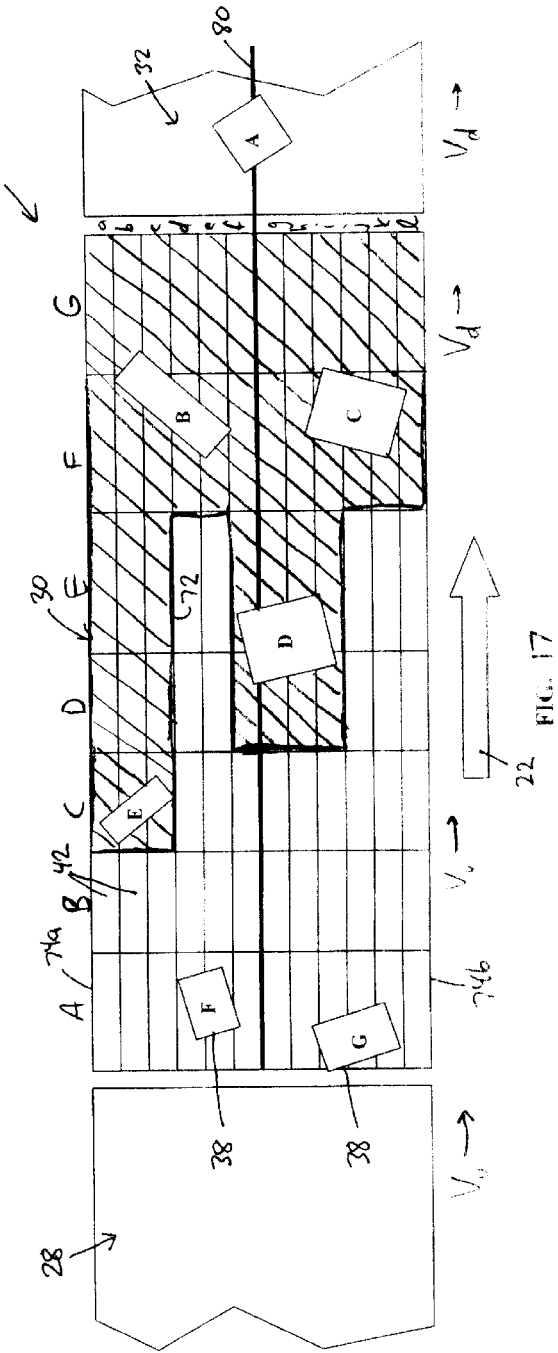

CONVEYOR SYSTEM WITH DISTRIBUTED ARTICLE MANIPULATION

CROSS REFERENCE TO RELATED APPLICATIONS

This application claims priority from United States provisional patent application Ser. No. 60/422,028, filed on Oct. 29, 2002, the disclosure of which is hereby incorporated herein by reference in its entirety.

BACKGROUND OF INVENTION

The present invention relates to conveyors, and more particularly to conveyors that manipulate articles. The invention may be applied in many ways, including by way of example, to separate batches of parcels by releasing parcels one at a time. Another application is to manipulate a stream of articles by delivering the articles one at a time with generally controlled gaps between the articles. The articles may also be aligned, such as lengthwise.

Conveyors-such as belt conveyors, roller conveyors, and other types of conveyors are in widespread use today for moving packages, parcels, mail, boxes, and other articles from one place to another. In many situations the articles that are to be carried by the conveyor are initially placed on a conveyor in a manner that is not conducive to being transported and processed by the conveyor system. Typically, the conveyor system is set up to optimally transport articles when they are arranged in a single-file line. In many situations, articles enter a conveyor system on conveyors that are sufficiently wide to accommodate multiple articles positioned side-by-side. In order to effectively process these side-by-side articles, it is desirable to manipulate them such that they are no longer arranged side-by-side, but rather in a single-file line. It may also be desirable to provide controlled gaps between the articles and to orient the articles in a particular manner, such as lengthwise.

In the past, several different types of article manipulators have been used, but these all contain features that have room for improvement. For example, PCT Application Serial No. PCT/US00/11370 (Publication No. WO 01/74693) discloses a hold and release singulator for manipulating items being transported. The hold and release singulator operates in a batch like fashion. In other words, groups of articles are transported onto the singulator, then stopped, and then individually caused to exit the singulator one at a time. After all of the articles have exited the singulator, another batch of articles is moved onto the singulator and the process is repeated. This method may produce an uneven flow of articles exiting the singulator. Further, a batch type manipulation process may not manipulate items as fast as a continuous process.

A continuous type of manipulation process is disclosed in European patent publication EP 0 979 788 82 (application number 99250264.1). However, not all items that enter the singulator of this patent will necessarily be manipulated during their first transport over the manipulation bed. The manipulation device disclosed in this patent includes a return section 70 in which non-manipulated items are re-circulated through the singulator. The re-circulation of these items is generally inefficient. Further, additional floor space must be provided to accommodate the re-circulation conveyors. Oftentimes factory floor space is at a premium and the use of additional space is desirably avoided.

PCT patent application serial no. PCT/US01/13556 (Publication No. WO 01/83339) discloses another existing type of article singulator. While the application discloses several different embodiments of an article singulator, none of these embodiments disclose a singulator which rotates articles. In addition to manipulating articles into a single file line, it is often desirable to rotate the articles such that their longitudinal axis is generally parallel to the longitudinal axis of the conveyor. The articles that enter a singulator are customarily oriented at all different angles. When a singulator is used, such as that disclosed in PCT application PCT/US01/13556, the orientation of the articles are not altered using the singulator. The articles therefore must be processed having skewed angular orientations, or additional means must be provided to rotate the articles to a desired orientation.

In light of the foregoing disadvantages with several of the prior art singulators, the desire can be seen for an improved singulator that overcomes these and other disadvantages.

SUMMARY OF INVENTION

Accordingly, the present invention provides an improved distributed manipulation system that overcomes many of the problems associated with the prior art. Specifically, the distributed manipulation system of the present invention takes up relatively little floor space, processes articles in a rapid manner, does not require recirculation of the items, is relatively quiet, and may process up to 6,000 or more articles per hour wherein the articles may have an average length of about 20 inches. The distributed manipulation system, according to the invention, utilizes a significant number of individual actuators to achieve exceptional dexterity.

A system for manipulating articles generally traveling in a direction of conveyance, according to an aspect of the invention, includes a bed made up of a plurality of conveyor groups, each of the conveyor groups being aligned with each other in the direction of conveyance and each of the conveyor groups made up of a plurality of individual conveyors positioned side-by-side in a direction transverse to the direction of conveyance. The conveyors are adapted to at least partially support articles traveling thereon and to move the articles in the direction of conveyance. At least one sensor is provided that is adapted to determine the position of the articles traveling over the plurality of conveyor groups. A controller is provided in communication with the at least one sensor and the conveyors. The controller is adapted to manipulate articles traveling on the manipulation bed by controlling the speed of the conveyors. The controller is further adapted to rotate an article positioned on the manipulation bed by controlling the speed of selected ones of the conveyors underneath the article such that at least the first one of the selected ones of the conveyors has a different speed than a second one of the selected conveyors.

A method of manipulating articles, according to another aspect of the invention, includes providing a bed having at least one conveying surface adapted to move articles in the direction of conveyance from an upstream end to a downstream end of the bed. The method further includes providing at least one sensor and using the at least one sensor to determine the position of any articles on the bed during at least one moment in time. The method further includes selecting an article on the bed to be manipulated, determining whether the selected article is to be located, and moving the selected article in the direction of conveyance at a speed generally higher than articles traveling on the bed that have yet to be manipulated. If the article is to be rotated, the selected article is rotated.

A system for manipulating articles generally traveling in a direction of conveyance, according to another aspect of the invention, includes a bed having at least one conveying surface adapted to move articles in a direction of conveyance from an upstream end to a downstream end of the bed. At least one sensor is provided that is adapted to determine the position of the articles traveling on the bed. A controller is provided that is in communication with the at least one sensor and the bed. The controller is adapted to manipulate articles traveling on the bed by controlling the speed of the conveying surface. The controller is further adapted to determine if two articles having overlapping alignment in a traverse direction on the bed are on opposite sides of a dividing line extending in the direction of conveyance. The transverse direction is that which is extending in a direction transverse to the direction of conveyance. The controller is adapted to cause the two articles to exit a downstream end of the bed during at least one coincident moment in time if the two articles are on opposite sides of the dividing line.

A method of manipulating articles, according to another aspect of the invention, includes providing a bed having at least one conveying surface adapted to move articles in the direction of conveyance from an upstream end to a downstream end of the bed. The method further includes providing at least one sensor and using the sensor to determine the position of any articles on the bed during at least one moment in time. The method further includes determining whether two articles on the bed have overlapping alignment in a transverse direction and whether the two articles are on opposite sides of a dividing line. The transverse direction is that which extends in a direction transverse to the direction of conveyance. The dividing line extends in the direction of conveyance. If the two articles are on opposite sides of the dividing line and have overlapping transverse alignment, the method provides moving the two articles such that they exit a downstream end of the bed during at least one coincident moment in time.

A system for manipulating articles generally traveling in a direction of conveyance, according to another aspect of the invention, includes a bed comprising a plurality of conveyor groups, the conveyor groups being generally aligned with each other in the direction of conveyance. Each of the conveyor groups consists of a plurality of individual conveyors positioned side-by-side in a direction transverse to the direction of conveyance. The conveyors are adapted to at least partially support articles traveling thereon and to move the articles in the direction of conveyance. At least one sensor is provided that is adapted to determine the position of the articles traveling over the plurality of conveyor groups. A controller is in communication with the at least one sensor and the conveyors. The controller is adapted to manipulated articles traveling on the bed by controlling the speed of the conveyors. The controller is further adapted to be able to control the speed of the conveyors at more than two different non-zero speeds.

As noted above, the various embodiments of the present invention provide a quiet, fast, compact, distributed manipulation system that uses no re-circulation. These and other benefits of the present invention will be apparent to one of ordinary skill in the art upon review of the following specification and accompanying drawings.

BRIEF DESCRIPTION OF DRAWINGS

FIG. 1 is a plan view of an article manipulation system according to one embodiment of the present invention;

FIG. 1A is a side, elevational view of the article manipulation system of FIG. 1;

FIG. 2A is a perspective view of one of two individual conveyors in a conveyor unit that may be used in the manipulation bed of FIGS. 1 and 1A;

FIG. 2B is a perspective view of the other of the two individual conveyors in the conveyor unit shown in FIG. 2A;

FIG. 3 is a plan view of a second embodiment of an article manipulation system according to the present invention;

FIG. 4 is a plan view of a manipulation bed and adjacent conveyors at a first moment in time;

FIG. 5 is a plan view of the conveyors of FIG. 4 at a second moment in time;

FIG. 12 is a plan view of a manipulation bed and adjacent conveyors that may be utilized in conjunction with the conveying system of FIG. 11, shown at a first moment in time;

FIG. 13 is a plan view of the conveyors of FIG. 12 shown at a second moment in time;

FIG. 16 is a plan view of the conveyors of FIG. 12 shown at a fifth moment in time;

FIG. 17 is a plan view of the conveyors of FIG. 12 shown at a sixth moment in time;

DESCRIPTION OF THE PREFERRED EMBODIMENT

Figure 3A:
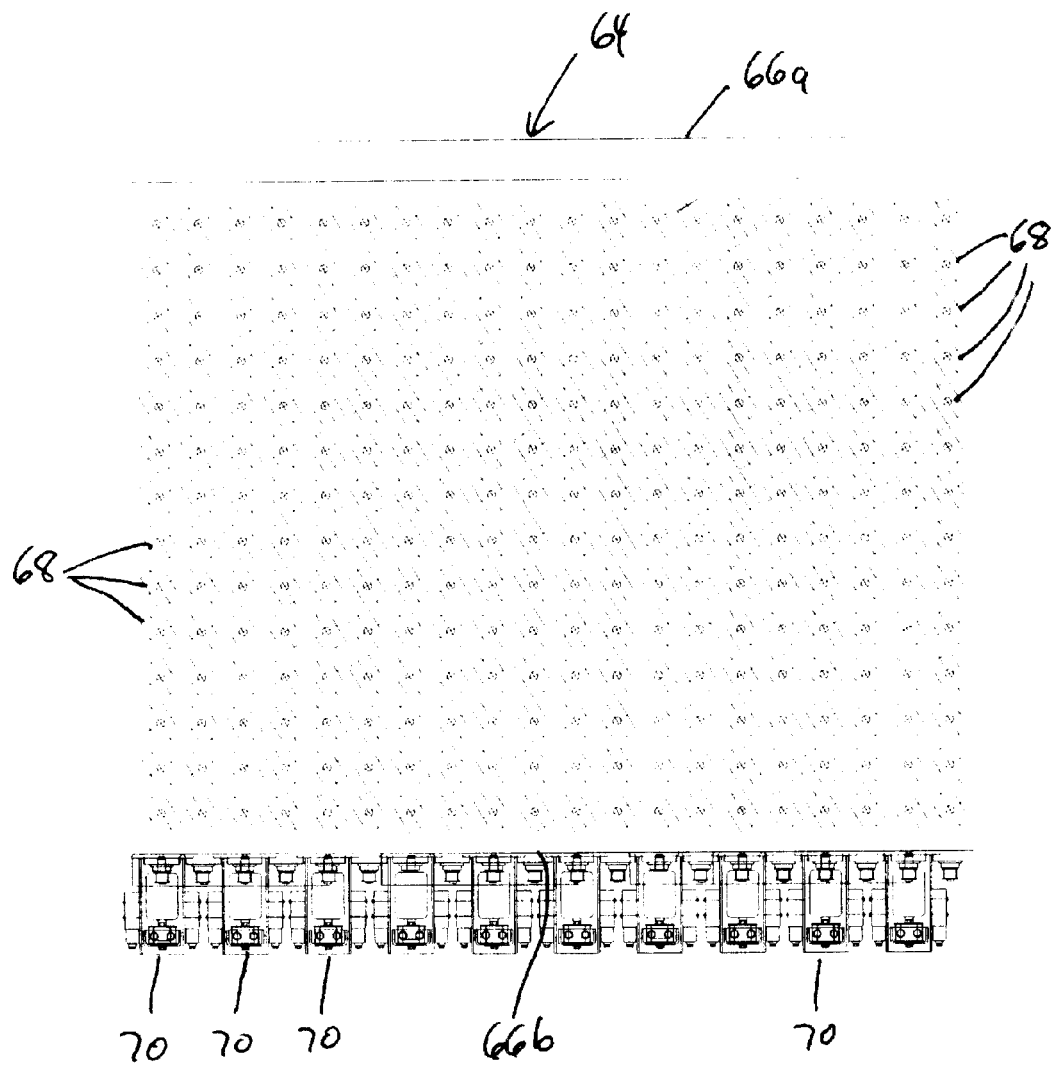
FIG. 3A is a plan view of diverter/merge conveyor of FIG. 3.

The present invention will now be described with reference to the accompanying drawings wherein the reference numerals in the following written description correspond to like-numbered elements in the accompanying drawings. An article manipulation system 20 according to a first embodiment of the present invention is depicted in FIGS. 1 and 1A. Article manipulation system 20 moves articles in a direction of conveyance indicated by arrow 22. Article manipulation system 20 includes a feed conveyor 24, a gapper 26, a transition conveyor 28, a distributed manipulation bed 30, and a downstream conveyor 32. Article manipulation system 20 further includes one or more article sensors. In the illustrated embodiment, a plurality of video cameras 34 and a photo sensor array 36 are used. However, other configurations of article sensors may be used. By way of example, a plurality of parallel photo sensor arrays 36 may be spaced along manipulation bed 30 between groups of individual conveyors 42. Alternatively, other types of overhead image capture devices may be used in lieu of cameras 34 to detect shapes of articles below.

In operation, articles 38 travel from feed conveyor 24 onto gapper 26. Gapper 26 enlarges the gaps between articles 38 in at least a lateral direction (i.e. in a direction transverse to the direction of conveyance 22). After passing over gapper 26, articles 38 move onto transition conveyor 28. The position, size, and orientation of the articles 38 is detected by photo sensor array 36 and/or video cameras 34. This information is fed to a controller 40 which processes this information and controls the speed of the individual conveyors that make up manipulation bed 30. Controller 40 controls the operation of manipulation bed 30 in such a way that articles 38 exit manipulation bed 30 one at a time with a desired gap between the articles. Stated alternatively, manipulation bed 30 manipulates articles 38 into a single stream of articles. As will be discussed more herein, controller 40 can be optionally programmed to manipulate articles into a dual stream of exiting articles, such as will be described in more detail with respect to the embodiment depicted in FIGS. 11–17.

Manipulation bed 30 is made up of a number of individual conveyors 42. In the embodiments of FIGS. 1 and 1A, conveyors 42 are belt conveyors. It will, of course, be understood that other types of conveyors 42 can be used within the scope of the present invention, such as those employing steered or non-steered wheels, rollers, or other types of conveying structures. As illustrated in FIGS. 2A and 2B, each conveyor 42 of a conveyor unit 41 includes a belt 44 that is wrapped around two or more idler rollers 46 that are generally aligned in a horizontal plane. Belt 44 is also wrapped around a drive roller 48 that may be positioned underneath idler rollers 46. The arrangement and position of motorized rollers 48 may be like that depicted in FIG. 1A, or, alternatively, like that depicted in FIGS. 2A and 2B.

In FIGS. 2A and 2B, the position of each drive roller 48 is alternated between a forward position, illustrated in one of the FIGS. 2A and 2B, and a rearward position, illustrated in the other of the FIGS. 2A and 2B, for each adjacent conveyor 42. This provides additional space for the drive rollers 48, as well as their associated motors 49, and any control wires and/or other structures. Each of the belts or FIG. 2A further include a tensioning roller 51 that is in operative contact with the associated belt. Tensioning rollers 51 are each biased toward their associated belt by a spring 51a operating on an eccentric 51b which is operative to move the shaft which rotatably supports the tensioning roller. Spring 51a and eccentric 51b are located opposite a support plate 43 from the associated tensioning roller. Tensioning rollers 51 maintain a constant amount of tension in the belts 44 due to the bias placed on tensioning rollers 51. Preferably, although not necessarily, tensioning rollers 51 are not aligned in a direction transverse to the direction of conveyance. This provides more space for positioning supporting structure underneath the top surface of belts 44.

As an alternative to the belt arrangement depicted in FIGS. 1A, 2A and 2B, conveyors 42 could be constructed in a wide variety of different manners. For example, one of end rollers 46 could be replaced with a drive roller 48 such that each conveyor 42 only had two rollers. As another alternative, conveyors 42 could be made of four rollers, with each roller at the vertex of a square or rectangle, when viewed from the side. As yet another alternative, conveyors 42 could include a number of support rollers underneath belt 44 generally in the horizontal plane of conveyance. Conveyors 42 could also be constructed without a belt 44. As one example, conveyors 42 could be made of one drive roller 48 connected by one or more O-rings to a series of adjacent rollers. Conveyors 42 could also be constructed in some of the manners described in PCT Patent Application Serial No. PCT/US01/13556 (Publication No. WO 01/83339), the disclosure of which is hereby incorporated herein in its entirety. Rollers 46 and 48 may be supported by support beams 50a and b or may be supported in any other conventional manner.

Each drive roller 48 is in communication with controller 40 via a communication line 52. Communication line 52 may be a single communication bus that is connected to each drive roller 48, or it may be a number of individual communication buses, each of which is connected to some of the drive rollers 48. As yet another alternative, communication line 52 could comprise separate communication lines from controller 40 to each and every drive roller 48. As will be discussed more below, controller 40 sends speed control commands over communication line 52 to each of drive rollers 48 to thereby control the speed at which conveyors 42 convey products in the direction of conveyance 22. Communication line 52 should allow messages communicated thereover to be transmitted quickly, such as within a few milliseconds, although greater communication times may be used. Controller 40 may also include additional communications lines (not shown) for communicating with other components of the overall material handling system. Thus, if not enough articles are being supplied to conveyor 32, controller 40 can increase its manipulation rate. Alternatively, it can slow down its manipulation rate where the downstream conveyors are not processing the articles quickly enough. Controller 40 preferably, although not necessarily, controls the speed of conveyors 28 and 32, in addition to conveyors 42 of manipulation bed 30.

Conveyors 42 of manipulation bed 30 are arranged in an array or matrix type of arrangement. Stated alternatively, manipulation bed 30 is made up of a plurality of columns or groups of conveyors 42 identified in FIG. 1 by the capital letters A–H. Each of these conveyor groups extends in a direction generally transverse to the direction of conveyance 22. Manipulation bed 30 also includes a plurality of conveyor rows identified in FIG. 1 by the lower case letters a–k. In the embodiment illustrated in FIG. 1, there are eight groups (columns) of conveyors and eleven rows of conveyors 42. Manipulation bed 30 therefore is made up of 88 individual conveyors 42. Each of these 88 conveyors 42 includes a drive roller 48 that has a unique address for communication with controller 40. The speed of each individual conveyor 42 can therefore be individually controlled.

It will be understood that manipulation bed 30 can include different numbers of groups and rows of conveyors 42. In other words, manipulation bed 30 may include more or less than eight transverse groups of conveyors 42. Likewise, manipulation bed 30 may include fewer or more than eleven rows of conveyors 42. The width of each conveyor belt 44 may range from 10 to 15 centimeters, although widths outside of these ranges can also be used. The length of each conveyor 42 may also vary from 30 to 100 centimeters, although other lengths can also be used outside of this range. Further, it is not necessary that the size of conveyors 42 be uniform throughout manipulation bed 30. For example, in the embodiment depicted in FIG. 3, the three downstream-most conveyor groups have a length that is longer than the four upstream-most transverse conveyor groups. Other variations are also possible in the size and shape of conveyors 42.

Gapper 26 is an optional component that may be utilized to increase the gaps between articles. The gaps may be increased in a direction transverse to the direction of conveyance 22, a lateral direction, or both. Increasing this gap will help video cameras 34 and/or photo sensor array 36 to distinguish the boundaries of individual articles 38. Gapper 26, in one embodiment, may include a number of individual belt conveyors 54. Each belt conveyor 54 is arranged at an angle with respect to the direction of conveyance 22. The magnitude of this angle increases from the center of gapper 26 towards its outer edges. Thus, in FIG. 1 belt conveyor 54D is angled slightly outwardly from the center of gapper 26. Belt conveyor 54C is angled outwardly to a greater extent. Belt 54B is angled outwardly even more and belt 54A is angled outwardly to the greatest extent. Belts 54E–H are shown with angles that are mirror images of the angles of belts 54A–D. As articles 38 travel over gapper 26, the angled nature of belt conveyors 54 exerts a transverse force on articles 38. This transverse force tends to create transverse gaps between the articles, or increase any pre-existing transverse gaps.

In order to ensure that a sufficient longitudinal gap exists between articles 38 so that video cameras 34 and/or sensor array 36 can distinguish between individual articles, gapper 26 may operate at a higher longitudinal speed than feed conveyor 24. This higher longitudinal speed will cause articles traveling from feed conveyor 24 onto gapper 26 to have their longitudinal gaps increase. The combination of feed conveyor 24 and the increased longitudinal speed of gapper 26 ensures that articles 38 will be sufficiently separated in both the lateral and longitudinal directions from each other so that they can be properly detected and processed by sensor array 36 and/or video cameras 34. The construction of gapper 26 may vary substantially from that depicted herein. For example, alternative constructions using wheels or other non-belt conveying means can be used.

Transition conveyor 28 may include a single belt 56, or it may be constructed with multiple belts, such as is illustrated in FIGS. 1–2. As illustrated, transition conveyor 28 includes two belts 56 that are each wrapped around a pair of end rollers 58. One of each pair of end rollers 58 may be a powered roller which powers the movement of belt 56 in the direction of conveyance 22. Transition conveyor 28 may alternatively be made up of a number of additional belts 56, such as is illustrated in the embodiment depicted in FIG. 3. By using multiple smaller belts 56, rather than one or a few large belts 56, the cost of manufacturing transition conveyor 28 may be decreased. Transition conveyor 28 is an optional component and may be omitted, especially in article manipulation systems in which no photo-sensor array, such as photo-sensor array 36, is used.

Photo sensor array 36 is an optional sensor that, if used, is preferably placed approximately in the middle of transition conveyor 28. Array 36 should be positioned far enough downstream of gapper 26 such that any residual sliding or rotating of articles that may have been caused by gapper 26 has stopped. The position of the articles detected by array 36 will therefore not unknowingly change downstream of array 36. Photo sensor array 36 consists of a plurality of individual photo sensors that are arranged to detect light, or other electromagnetic energy, that is emitted downwardly onto the surface of transition conveyor 28 and array 36. This light may be fluorescent light that is emitted from a fluorescent light bulb (not shown) positioned above array 36 at a sufficient height to allow articles 38 to travel underneath the light bulb while on transition conveyor 28. Photo sensor array 36 includes sensors for detecting the light energy. Because the light, or other energy, will be obscured by articles 38 traveling over array 36, photo sensor array 36 can distinguish between articles 38 and an empty space on transition conveyor 28. Photo sensor array 36 preferably, although not necessarily, comprises an array of sensors that are closely packed together and extend in a transverse direction. The individual sensors of array 36 may be positioned within five millimeters or less of each other, although other spacing may be used. The sensor array 36 may be a conventional product such as is manufactured by Kore Computing of Comstock Park, Mich. or SICK, Inc. of Bloomington, Minn. The outputs of each sensor in array 36 are preferably scanned multiple times per second with sufficient speed to allow the size, orientation, and position of articles 38 to be detected as they pass above array 36. This information is passed from array 36 to controller 40 by way of a communications line 60. Controller 40 uses this information, along with information from video cameras 34 if so equipped, to determine which will be the next article to be manipulated, whether it will need to be rotated, and to make other determinations as will be discussed in more detail below.

In the embodiments illustrated in FIGS. 1 and 1A, there are three video cameras 34a–c. It will be understood by those skilled in the art that a different number of video cameras 34 can be used to practice the present invention. As previously disclosed, other article sensors, such as other types of overhead article shape sensors or additional photo sensor arrays spaced along the bed in the direction of article flow, may be used in the alternative. Video cameras 34a–c are positioned above manipulation bed 30 and transition conveyor 28. Video cameras 34a–c thus detect the movement of articles 38 on transition conveyor 28 and manipulation bed 30. Further, video cameras 34a–c determine the position and/or shape of each article 38 with sufficient accuracy to allow controller 40 to properly manipulate articles on manipulation bed 30. Video cameras 34a–c communicate with controller 40 over a communications line 62. Video cameras 34a–c may be used in conjunction with photo-array 36, or they may be used without photo-array 36. Alternatively, the article manipulation system may use only a photo-array 36 without any video cameras 34.

Controller 40, which may be a conventional programmable logic controller (PLC) a personal computer, or any other type of computer, receives and processes the information from video cameras 34a–c and/or photo sensor array 36. Controller 40 includes conventional video image processing software that processes the information received from video cameras 34a–c. This software allows controller 40 to know precisely where each article 38 is positioned on either transition conveyor 28 or manipulation bed 30. In particular, when articles 38 are positioned on manipulation bed 30, the output from video cameras 34a–c allows controller 40 to determine which specific conveyors 42 are underneath each of the articles 38 on manipulation bed 30. Controller 40 then sends appropriate speed commands over communications line 52 to control the speed of individual conveyors 42 to effectuate manipulation of article 38.

A diverter/merge conveyor 64 may be positioned adjacent the downstream end of manipulation bed 30. Diverter/merge conveyor 64 may be used to perform several different functions, depending upon the desired application. In one application, diverter/merge conveyor 64 simply directs the incoming articles from manipulation bed 30 toward a generally uniform position on conveyor 64 with respect to its side 66a and b. This is a useful operation where the conveyor downstream of conveyor 64 has a narrower width than that of conveyor 64. In order to ensure articles exiting conveyor 64 will be aligned with this narrower width, conveyor 64 steers the articles traveling thereon so that they will be aligned with the downstream conveyor.

In an alternative application, diverter/merge conveyor 64 may be used to steer articles traveling thereon to two or more downstream conveyors, each of which may, in turn, lead to a separate conventional sortation apparatus. In the embodiment depicted in FIG. 3A, diverter/merge conveyor 64 is a conventional steered wheel conveyor. As illustrated in FIG. 3A, conveyor 64 includes a plurality of individually steered wheels 68. Each wheel 68 rotates about a horizontal axis. The orientation of this horizontal axis can be changed between an orientation parallel to the direction of conveyance 22 to a horizontal direction that is skew to this. The changing of these horizontal axes can be accomplished in a conventional manner through the use of actuators 70, or other devices. Typically, each column of wheels 68 that extends from side 66a–b are controlled in unison. The individual columns can be controlled independently from other columns, if desired. The control of conveyor 64 may be carried out by a local controller that is part of conveyor 64, or it may be controlled by controller 40. The rotation of wheels 68 exerts a force against articles traveling on conveyor 64. The direction of this force is dependent upon the horizontal orientation of the horizontal axes of the wheels 68. By appropriately changing the orientation of these horizontal axes, the side-to-side position of articles traveling on conveyor 64 can be altered as desired.

Controller 40 controls the manipulation of articles 38 that takes place on manipulation bed 30. Controller 40 can be programmed to manipulate articles in a variety of different manners. A first method for manipulating articles is depicted in FIGS. 4–10. A second method of manipulating articles is depicted in FIGS. 12–17. In the first method, articles traveling on manipulation bed 30 may be rotated so that their longitudinal axis is closer to being parallel to the direction of conveyance. Regardless of whether articles are rotated or not, this first method of control causes the articles to exit one at a time from the downstream end of manipulation bed 30. In the second manner of manipulation depicted in FIGS. 12–17, article rotation may or may not be included as part of the programming. Regardless of whether rotation is included as part of the programming of controller 40, the second method involves allowing articles to simultaneously exit the downstream end of manipulation bed 30 provided that the articles are sufficiently spaced apart laterally. These two methods will be described in more detail below.

Referring now to FIG. 4, a plurality of articles 38 are shown initially positioned on transition conveyor 28. Articles 38 have been individually identified by capital letters A–G. At the moment in time depicted in FIG. 4, video cameras 34 and/or photo sensor array 36 have provided controller 40 with sufficient information for it to determine the locations of articles A–G. Controller 40 selects the downstream-most article that can be advanced without colliding with an adjacent article. In the illustration of FIG. 4, article B has a corner that is the furthest downstream of any other part of the illustrated articles. However, if article B were to be advanced in the direction of conveyance, it would collide with article A. Therefore, controller 40 selects article A as the first article to be manipulated. Controller 40 therefore determines which row of conveyors 42 will be positioned under article A as it travels over manipulation bed 30.

The individual conveyors 42 of manipulation bed 30 are generally controlled to operate at one of two different speeds. As will be discussed more below, when rotation of articles is desired, other speeds may be used other than these two different speeds. The first speed is illustrated in FIG. 4 as $V_u$ and refers to the velocity at the upstream end of manipulation bed 30. Speed $V_u$ may also be the velocity of transition conveyor 28. The other speed is illustrated in FIG. 4 as $V_d$, and refers to the downstream velocity of manipulation bed 30. Speed $V_d$ may also be the speed of downstream conveyor 32. A boundary line 72 separates those conveyors 42 that are operating at speeds $V_d$ from those operating at the speed $V_u$. The conveyors operating at speeds $V_d$ are also shaded in FIGS. 4–10 for greater clarity. Speed $V_d$ is greater than speed $V_u$. Therefore, articles traveling on conveyors 42 operating at speed $V_d$ will separate themselves from other articles on conveyors 42 traveling at speed $V_u$.

It will be understood that controller 40 may control the speeds of individual conveyors 42 so that articles transitioning across boundary 72 from speed $V_u$ to speed $V_d$ will have their instantaneous accelerations reduced or minimized. In other words, a conveyor 42 that is to operate at speed $V_d$, and that is downstream of an adjacent conveyor traveling at speed $V_u$, may initially have its speed set to match, or come close to, the speed $V_u$ of the adjacent upstream conveyor. After the article has transitioned onto the downstream conveyor 42, its speed is increased to that of $V_d$. In this manner, article slippage on the conveyor belts, noise from this slippage, and wear on the belts is reduced. Conveyor belts 42 therefore may be operable at two or more non-zero speeds and may be operable at essentially infinitely variable speeds. The shaded areas in the accompanying drawings representing conveyors 42 operating at speeds $V_d$ are thus somewhat generalized to illustrate the underlying control logic used by controller 40. Individual belts within the shaded areas may operate at speeds other than $V_d$, particularly those belts involved in transitioning an article across boundary line 72. Unoccupied belts downstream of those operating at $V_d$ also may not operate at this same speed until the article traveling at speed $V_d$ is actually delivered to these unoccupied belts.

Controller 40 operates to alter boundary line 72 as articles 38 travel over manipulation bed 30 such that articles are manipulated. With the exception of the rotation of articles, the algorithms that controller 40 follows in altering the position of boundary line 72 in FIGS. 4–10 may be the same as those disclosed in International Patent Application Serial No. PCT/US01/13556, the disclosure of which is hereby incorporated herein by reference.

As article A transitions from transition conveyor 28 to manipulation bed 30 in FIG. 4, the speed of article A will increase relative to the other articles at the moment that article A is sufficiently on manipulation bed 30 to be controlled by the conveyors 42 underneath it. The longitudinal space between article A and the other articles will therefore begin to increase after article A's speed transitions from that of $V_u$ to $V_d$. At the moment in time illustrated by FIG. 5, the individual conveyors 42 that are underneath article A are conveyors 42Af and 42Ag. A small portion of article B also overlies conveyor 42Af. Because this portion is so small relative to the size of article B, controller 40 determines that the operation of conveyor 42Af at speed $V_d$ will not affect the position or orientation of article B.

If article B in FIG. 5 extended further on to conveyor 42Af, then controller 40 would only run conveyors 42Af and Ag at speed $V_d$ until article B arrived at either or both of these conveyors. At that moment in time, controller 40 would decrease the speed of these two conveyors to $V_u$. The longitudinal gap between article A and article B would therefore only be increased for the time during which article A was traveling at speed $V_d$ while article B was traveling at speed $V_u$. If more longitudinal gap were desired between articles A and B than was created by operating conveyors 42Af and Ag at speed $V_d$, an increased longitudinal gap could be created by operating conveyors 42Bf and Bg at speed $V_d$ while article B had not entered onto any of these conveyors. Similar longitudinal gaps between articles A and B could be created using conveyors 42Cf and Cg, as well as the conveyors in rows f and g and columns D, E, F, and G.

Figure 6:
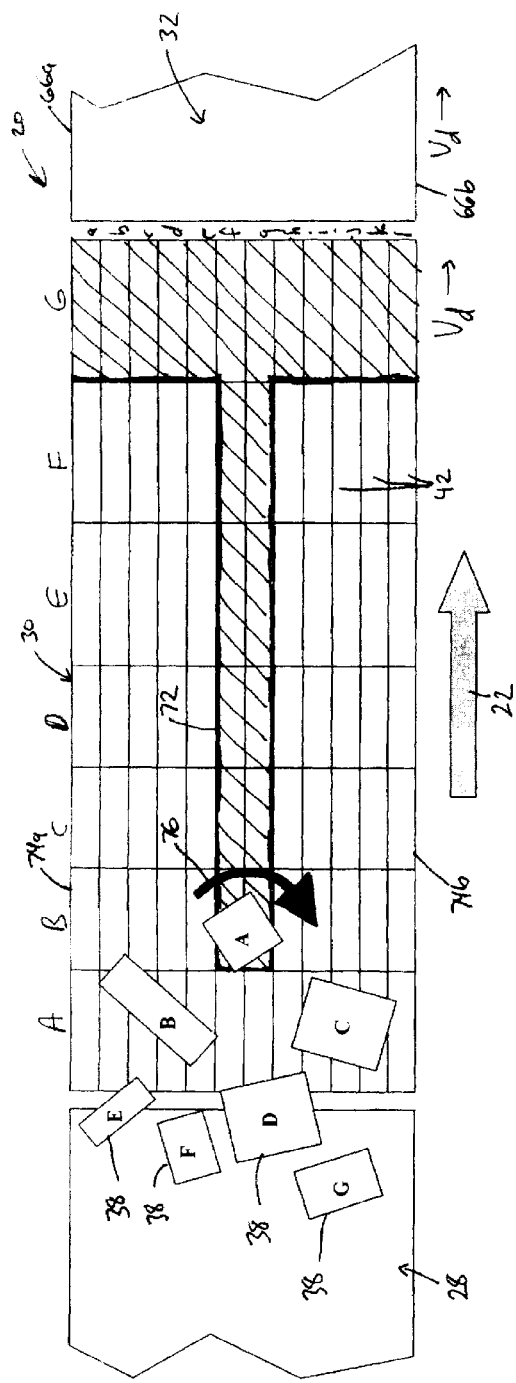
FIG. 6 is a plan view of the conveyors of FIG. 4 at a third moment in time.

FIG. 6 illustrates a moment in time subsequent to that illustrated in FIG. 5. At this moment in time, controller 40 has changed the speed of conveyors Af and Ag back to that of $V_u$. Controller 40 has determined that the next article to be manipulated will be article B. By returning conveyors 42Af and Ag to speed $V_u$, the relative position of article D with respect to the other articles, such as article B will not be altered. The information that controller 40 receives from video cameras 34a–c and photo sensor 36 indicates that article A has a skew orientation relative to the sides of 74A and B of manipulation bed 30. Video cameras 34 and sensor array 36 provide sufficient information to controller 40 for it to determine this angular orientation with respect to side 74. If this angular orientation exceeds a predetermined value, controller 40 determines that the article should be rotated. The article is then rotated so that this angle is decreased. This rotation of articles helps the downstream processing of articles on the conveying system.

In general, controller 40 may be programmed to rotate all articles whose longitudinal orientation is greater than +/−15° with respect to the direction of conveyance. Other thresholds may be chosen. For square articles greater than a given size, such as 250 mm×250 mm, controller 40 may be programmed to rotate these articles so that one of the sides of the article is less skew with respect to the direction of conveyance. For square articles smaller than this given size, controller 40 may be programmed to not rotate the articles, regardless of their degree of skew. Oblong or irregularly shaped articles may be processed with or without rotation, depending on their aspect ratio. If the aspect ratio exceeds a given threshold, then rotation would more likely be carried out. Where the aspect ratio does not exceed a given threshold, no rotation would be carried out.

Figure 7:
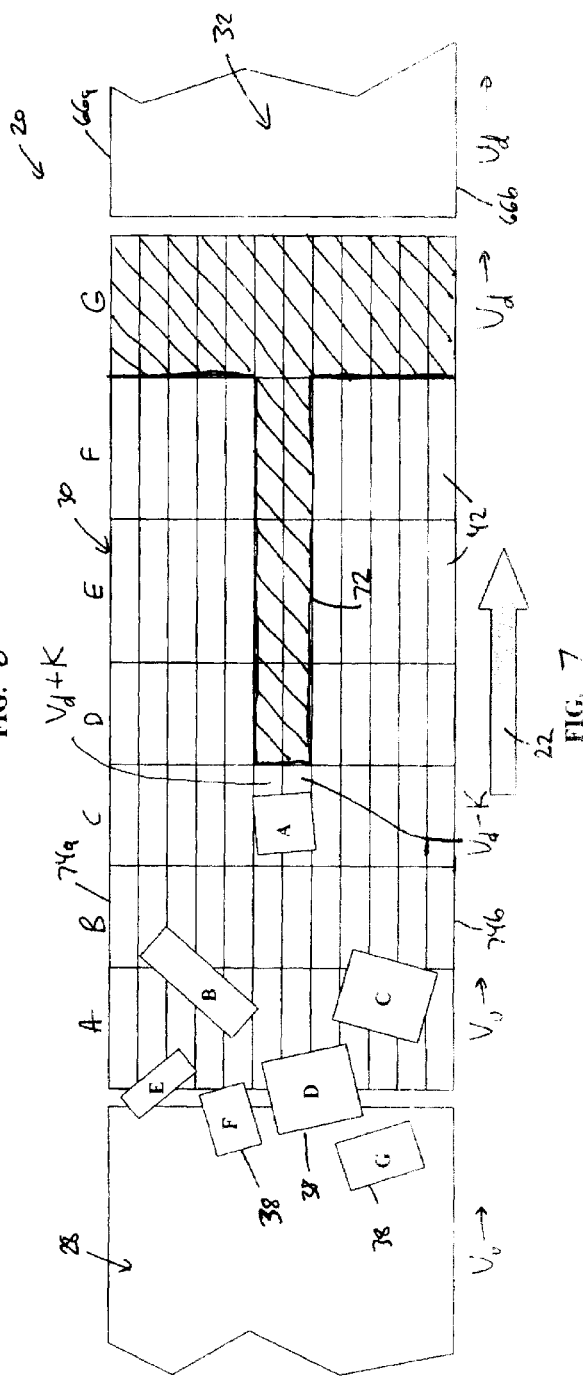
FIG. 7 is a plan view of the conveyors of FIG. 4 at a fourth moment in time.

In the illustrated embodiment, controller 40 determines that article A has such a skew orientation that it will be rotated. Controller 40 will rotate article A in a clockwise direction indicated by arrow 76 in FIG. 6. This rotation is accomplished by increasing the speed of conveyor 42Bf relative to that of conveyor 42Bg. Controlled speed differences between the conveyors in rows f and g that underlie article A are maintained in each conveyor column until rotation has taken place. Therefore, as illustrated in FIG. 7, conveyor 42Cf and Cg will operate with a speed difference, for at least an initial period of time. In FIG. 7, conveyor 42Cf is operating at a speed $V_d$+K. Conveyor 42Cg is operating at a speed $V_d$−K. This difference is speed causes article A to rotate such that its sides become less skewed with respect to sides 74a and b of manipulation bed 30. The precise value of the variable K can be varied as desired. In order to more quickly rotate an article, the value K should be higher, as would be known by one with ordinary skill in the art. The value of K may vary for each individual article, depending on the degree of skewness of the article, the size of the article, and other factors. The value of K may also vary with respect to time during the rotation of a given article. This time variation may include a gradual ramping up to a peak value of K, followed by a gradual descending back to a zero value during rotation so that instantaneous accelerations of the article are reduced. Other types of time-varying changes to the value of K may also be implemented. Controller 40 may be programmed to rotate articles generally about their center position. Video cameras 34 can be used to monitor the actual article rotation to provide feedback to controller 40 during the rotation process. This feedback is used by controller 40 to control the rotation process more accurately.

Figure 8:
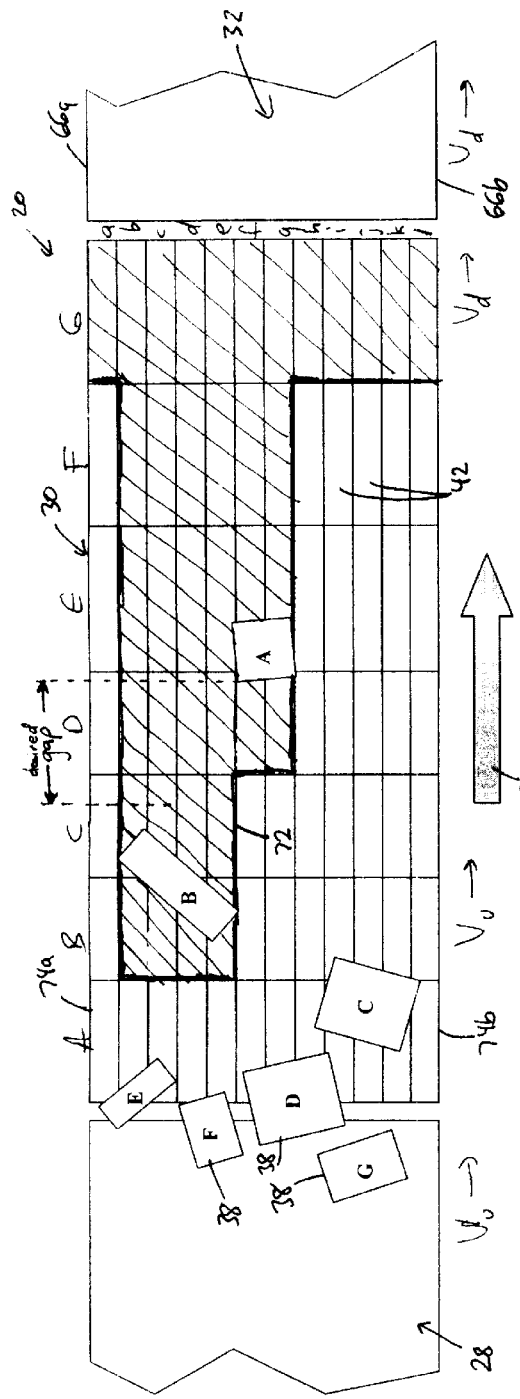
FIG. 8 is a plan view of the conveyors of FIG. 4 at a fifth moment in time.

As illustrated in FIG. 8, the speed of the conveyors 42 underneath article A are reset to $V_d$ after the rotation of the article is complete. Article A will then continue to travel down manipulation bed at $V_d$. The speed of the conveyors under article B will be increased to that of $V_d$ when a desired longitudinal gap has been achieved between articles A and B. This gap may be set anywhere from zero to whatever spacing is desired for articles in a particular application. For articles that will not be rotated, the gap is the longitudinal distance between the upstream end of the leading article and the downstream end of the trailing article. For situations in which one or more articles will be rotated, the gap is the longitudinal distance, after rotation, between the upstream end of the leading article and the downstream end of the trailing article. As illustrated in FIG. 8, the desired gap is less than that between the upstream end of article A and the downstream end of article B because controller 40 has determined that article B will be rotated. The desired gap is therefore the longitudinal separation between articles A and B that will be present after article B has been rotated. Controller 40 computes this gap and may use feedback from cameras 34 to verify the rotation of the articles. The size of the desired gap can be dynamically changed by controller 40. Once this desired gap has been achieved, conveyors 42 in rows b–e will be set to speed $V_d$ for conveyor columns B–F. Article B will therefore begin to longitudinally separate from the other articles traveling at speed $V_u$.

Figure 9:
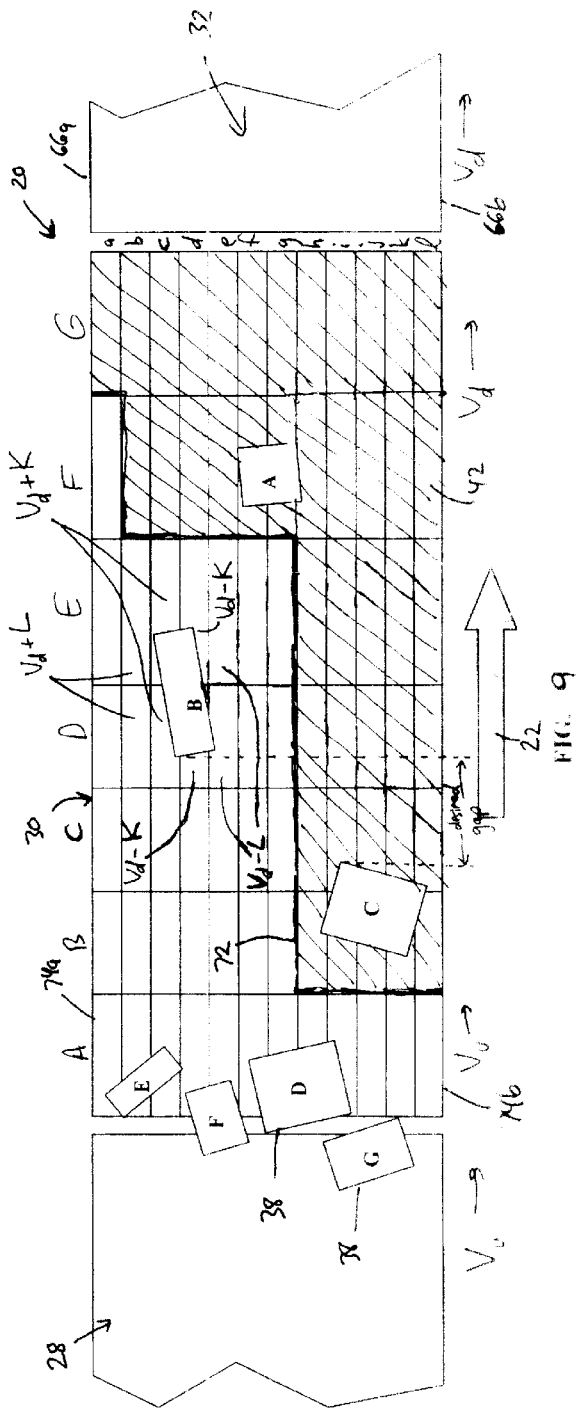
FIG. 9 is a plan view of the conveyors of FIG. 4 at a sixth moment in time.

As illustrated in FIG. 9, the rotation of article B is carried out in a similar manner to that of article A. Specifically, the speed of the conveyors in rows b and c underneath article B are increased relative to the speed of conveyors 42 in rows d and e. As illustrated in FIG. 9, conveyors 42 Db and Eb are operating at a speed $V_d$+L. Conveyors 42Dc and 42Ec are set at a speed $V_d$+K. Conveyors 42Dd and Ed are set at a speed $V_d$−K. Conveyors 42De and Ee are set at a speed $V_d$−L. These speeds K and L may be set as proportional to the lateral distance away from the point of rotation on article B. Thus, the variable L will have a greater value than the variable K. The value of L, like the value of K, may vary between articles and it may vary with time over the course of rotating a given article. The varying speeds of the conveyors underlining article B will thus cause article B to rotate in a clockwise direction. After rotation, it will have the desired longitudinal gap between itself and article A.

Figure 10:
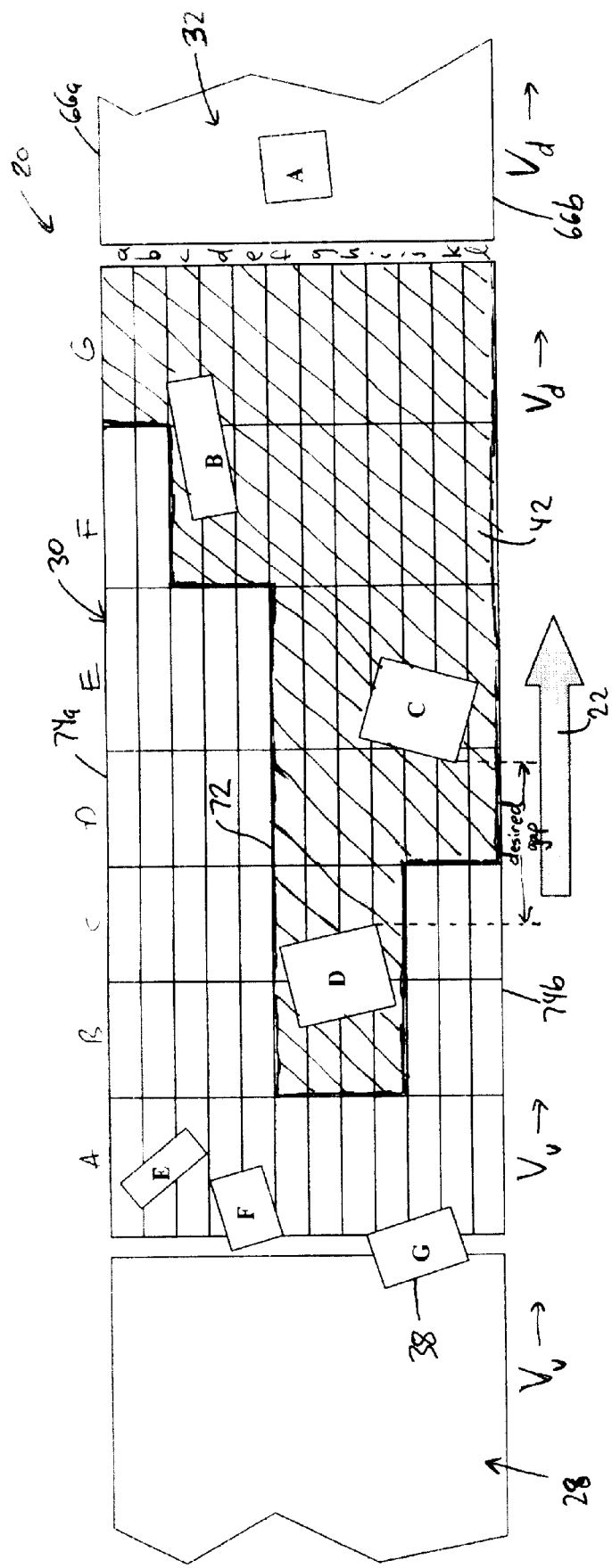
FIG. 10 is a plan view of the conveyors of FIG. 4 at a seventh moment in time.

As is also illustrated in FIG. 9, controller 40 will increase the speed of the conveyors underneath article C when a desired gap is obtained between article B (after rotation) and article C. Because article C will not be rotated, the conveyor 42 underneath article C will simply be increased to speed $V_d$. Once article C has advanced down manipulation bed 30 such that a desired gap is obtained between articles C and D, the conveyors 42 underlying article D will have their speed increased to that of $V_d$ by controller 40, as is illustrated in FIG. 10. Controller 40 will continue to increase the speed of the underlying conveyors of each article as desired gaps are obtained. Thus, controller 40 will increase the speeds of the conveyors 42 underlying article E after a desired gap is obtained. Because article E will be rotated, this desired gap will be the gap created after rotation. Controller 40 will continue to operate in a similar fashion for articles F and G, and all subsequent articles.

While the operation of manipulation bed 30 and controller 40 has been illustrated with respect to only seven articles, it will be understood that manipulation bed 30 and controller 40 may operate substantially continuously. Alternatively, the operation of manipulation bed 30 may be a batch type of operation. As illustrated in FIG. 10, article A has been manipulated onto downstream conveyor 32. At later moments in time, articles B, C, and D, as well as the rest of the articles will arrive at downstream conveyor 32 in a manipulated fashion. As described previously, downstream conveyor 32 may be constructed to alter the lateral position of the manipulated articles with respect to sides 66a and b.

Figure 11:
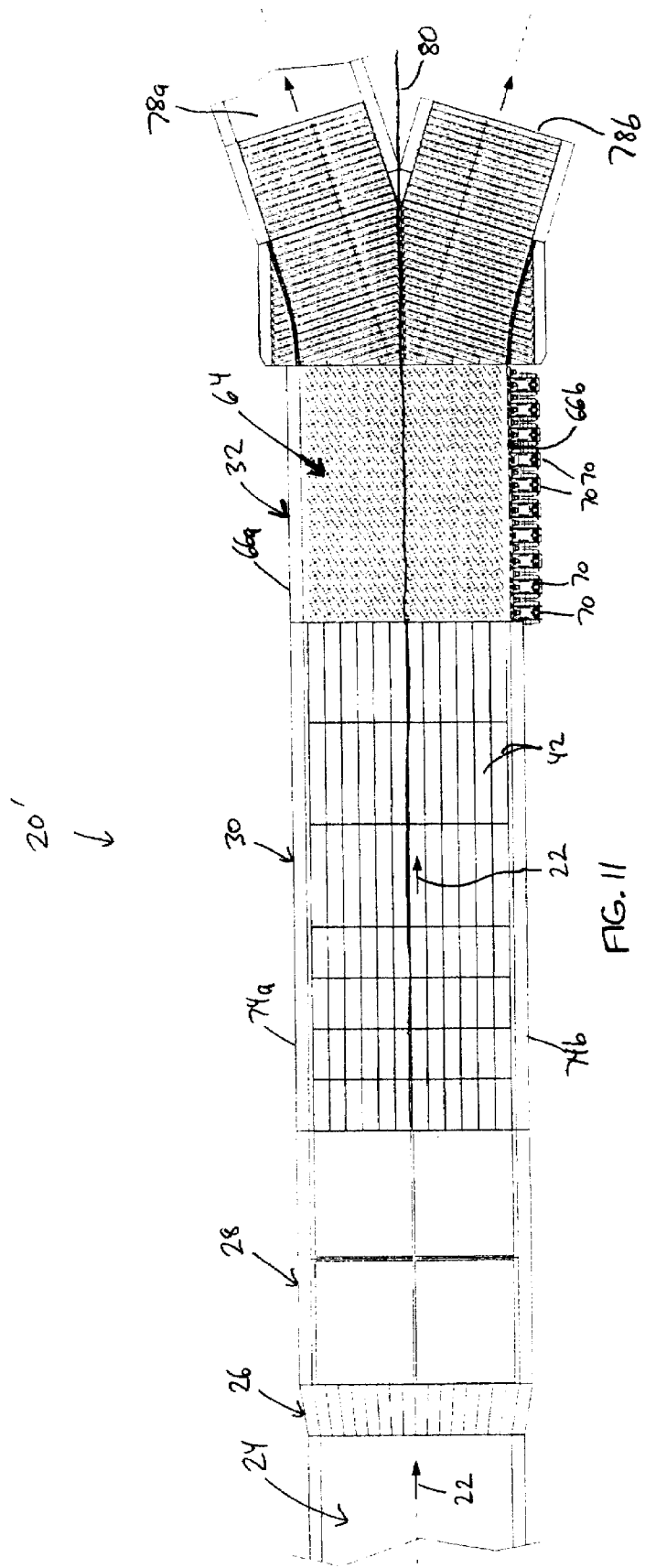
FIG. 11 is a plan view of an article manipulation system that incorporates the elements of the system of FIG. 3.

FIG. 11 illustrates an alternative embodiment of article manipulation system 20' according to another aspect of the present invention. Article manipulation system 20' differs from that of article manipulation system 20 in that a pair of branch conveyors 78a and b are positioned downstream of downstream conveyor 32. Articles exiting downstream conveyor 32 will therefore travel down one of branch conveyor 78a or 78b. Article manipulation system 20' includes a feed conveyor 24, a gapper 26, a transition conveyor 28, a manipulation bed 30, and a downstream conveyor 32. Further, although not illustrated in FIG. 11, it includes video cameras 34 and/or a photo sensor array 36 (also not illustrated). Transition conveyor 28 may be made up of a number of separate belts in order to minimize the costs of manufacturing transition conveyor 28. The operation of article manipulation system 20' is illustrated in FIGS. 12–17, which are described in more detail below.

As a general matter, manipulation bed 30 of article manipulation system 20' operates generally in a similar manner as has been previously described with respect to article manipulation system 20. Article manipulation system 20' differs from article manipulation system 20 in that article manipulation system 20' includes an imaginary dividing line 80. Imaginary dividing line 80 is located at a lateral position with respect to sides 74a and b of manipulation bed 30 that is collinear with the separation line between branch conveyor 78a and b. Controller 40 is programmed to allow multiple articles to exit from manipulation bed 30 at the same time in those instances where the multiple articles are on opposite sides of dividing line 80, or where the articles can be separated by conveyor 32 so as to travel down each of conveyors 78a and b. Thus, article manipulation system 20' manipulates articles, where possible, into two streams of articles. This is described in more detail below.

Controller 40 determines that article A will be the first article to be manipulated. This determination is made using the same criteria as described above with respect to article manipulation system 20. Accordingly, controller 40 increases the speed of those individual conveyors 42 that are in rows f and g to that of $V_d$. The conveyors in these two rows are the conveyors that are laterally in line with article A. Therefore, when article A enters onto manipulation bed 30, its speed relative to the other articles will increase, and therefore its longitudinal separation. As illustrated in FIGS. 12 and 13, article A overlies dividing line 80. Thus, a portion of article A lies above dividing line 80 (toward side 74a) and a portion of article A lies below dividing line 80 (toward side 74b). Controller 40 therefore determines that article A will be manipulated by itself; that is without simultaneously manipulating any other article. Controller 40 of article manipulation system 20' is programmed to determine whether the next article to be manipulated is either fully above or below dividing line 80. If controller 40 of article manipulation system 20' is further adapted to rotate articles, then the determination of whether an article is below or above dividing line 80 is made with respect to the article's post-rotation position.

Figure 14:
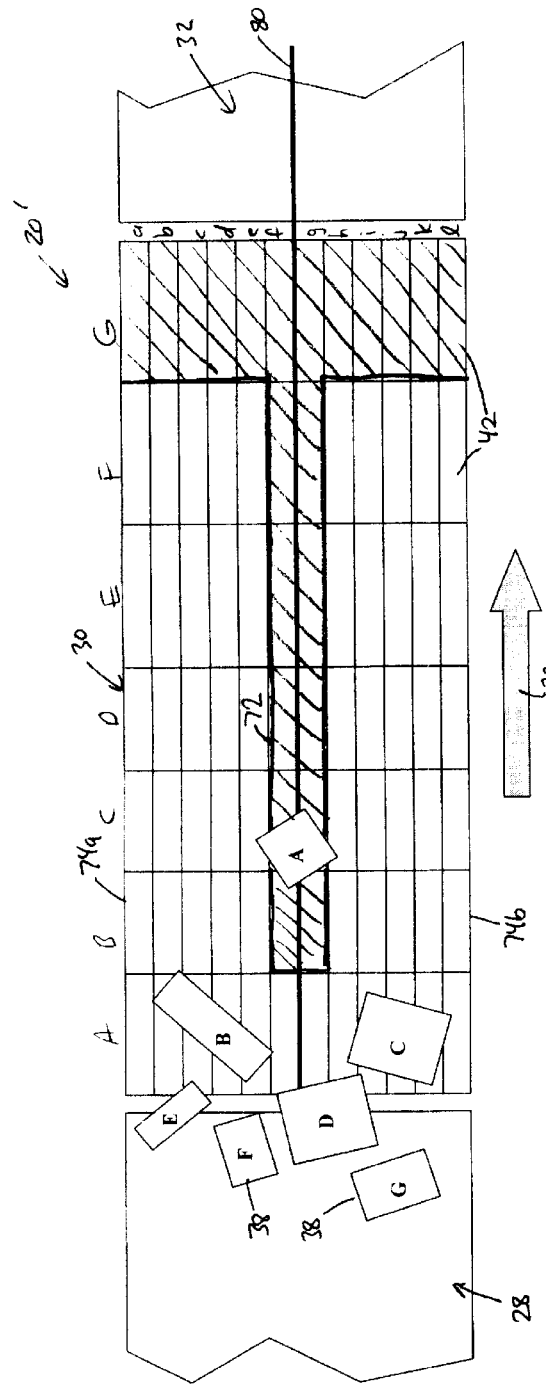
FIG. 14 is a plan view of the conveyors of FIG. 12 shown at a third moment in time.
Figure 15:
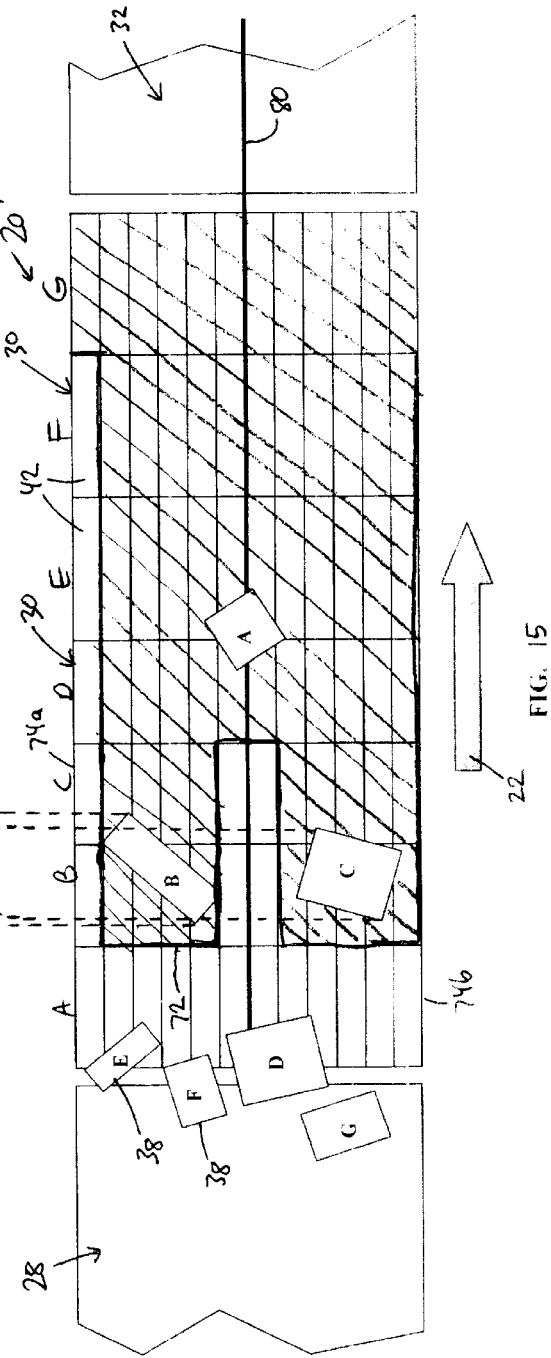
FIG. 15 is a plan view of the conveyors of FIG. 12 shown at a fourth moment in time.

As illustrated in FIG. 14, the longitudinal separation of article A from the other articles will increase. Controller 40 reduces the speed of conveyors 42Af and Ag after article A has exited from these conveyors. This reduction in speed back to speed $V_u$ prevents article D from having its position and/or orientation changed with respect to the other articles traveling at speed $V_u$. Controller 40 determines that the next article to be manipulated is article B. Controller 40 determines that article B is fully above dividing line 80. Therefore, controller 40 next determines if article B has any overlapping alignment in a transverse direction with another article (FIG. 15). This determination is made by extending the trailing and leading edges of article B perpendicularly toward one of sides 74a and b. The trailing and leading edges of article C are also extended toward the same side. To the extent the area between the trailing and leading edges of each respective package overlaps, controller 40 concludes that there is overlapping alignment in a direction transverse to the direction of conveyance. In the example illustrated in FIG. 15, controller 40 determines that articles B and C have overlapping transverse alignment. Controller 40 therefore next determines whether article C is positioned on an opposite side of dividing line 80 as article B. In the illustrated case, it is. Therefore, controller 40 determines that articles B and C can be simultaneously advanced toward the downstream end of manipulation bed 30. Articles B and C will thus exit manipulation bed 30 at a coincident moment in time. Because they are positioned on opposite sides of the dividing line 80, article B will end up proceeding down branch conveyor 78a, while article C will eventually move down branch conveyor 78b. By simultaneously advancing articles B and C together, manipulation bed 30 can increase its throughput. If article C had not been on an opposite side of dividing line 80, then controller 40 would have changed the speeds of the conveyors under article B such that it would have advanced ahead of article C.

As illustrated in FIG. 16, the individual conveyors 42 underlying article D will have their speed increased to that of $V_d$ when a desired gap is created between either article B or article C. Controller 40 will determine which of articles B or C to use as a reference for the gap between it and article D on the basis of which branch conveyor 78 article D will be traveling down. Specifically, because a majority of article D is positioned below dividing line 80, downstream conveyor 32 will likely divert article C down branch conveyor 78b. Therefore, controller 40 will wait until the gap between articles C and D reaches a desired gap before increasing the speed of the conveyors 42 underneath article D to that of $V_d$. Controller 40 therefore determines the desired gap between articles that will successively travel down the same branch conveyor 78.

As illustrated in FIG. 17, controller 40 will determine that article E is the next article to be manipulated. Controller 40 will determine that article E is completely on one side of dividing line 80. Controller 40 will therefore determine whether article E has any overlapping alignment with another article. Because article E does indeed have overlapping alignment with article F (see FIG. 16), controller 40 will next determine whether article F is completely below dividing line 80. Because article F is not completely below dividing line 80, articles E and F cannot be manipulated simultaneously. This is because divert/merge conveyor 64 does not have the means to separate articles E and F laterally such that one of them will travel down conveyor 78a and the other down conveyor 78b. Therefore, controller 40 will increase the speeds of conveyors 42 underneath article E to that of $V_d$. As illustrated in FIG. 17 this will increase the longitudinal spacing between articles E and F. If a divert/merge conveyor 64 is used that allows the lateral spacing between articles thereon to be controlled, then it would be possible to manipulate articles E and F simultaneously. Conveyor 64 would separate these articles so that they exited conveyor 64 on opposite sides of dividing line 80, thereby directing them to opposite branch conveyors 78a and b.

Controller 40 next determines that article F is completely to one side of dividing line 80 and that it has overlapping transverse alignment with respect to article G. Furthermore, controller 40 determines that article G is completely to the other side of dividing line 80. Therefore, controller 40 will simultaneously advance articles F and G so that they can be manipulated together, in the same manner that articles B and C were manipulated.

Manipulation bed 30 of article manipulation system 20' may also operate in a continuous fashion or a batch fashion, just as manipulation bed 30 of article manipulation system 20. As has been noted previously, controller 40 of article manipulation system 20' may optionally include programming that allows articles to be rotated in a manner described with respect to FIGS. 4–10. When controller 40 is programmed in this way, controller 40 makes all of its determinations with respect to dividing line 80 based on the post-rotational position of articles. In other words, controller 40 determines what positions articles will be in after they are rotated. These post-rotation positions are then used to determine whether an article is completely on one side or another of dividing line 80 as well as whether or not it has any transverse alignment with another article.

The gaps between articles exiting manipulation bed 30 of article manipulation system 20' may be dynamically controlled by controller 40. Controller 40 may alter these gaps based on information it receives from other components in the overall conveyor or material handling system. Alternatively, the gaps may be adjusted by an operator inputting this information into controller 40. In article manipulation system 20', the desired gaps are determined with respect to articles that will travel down the same branch conveyor 78a or b. Thus, a pair of articles may exit bed 30 with less than the desired longitudinal gap between the two articles if they are to be sent down opposite ones of conveyors 78a and b. In such a case, it is the longitudinal gap between each article and the downstream article on the same destination conveyor 78a or b that is controlled, not the longitudinal gap between each article in the pair.

Figure 18:
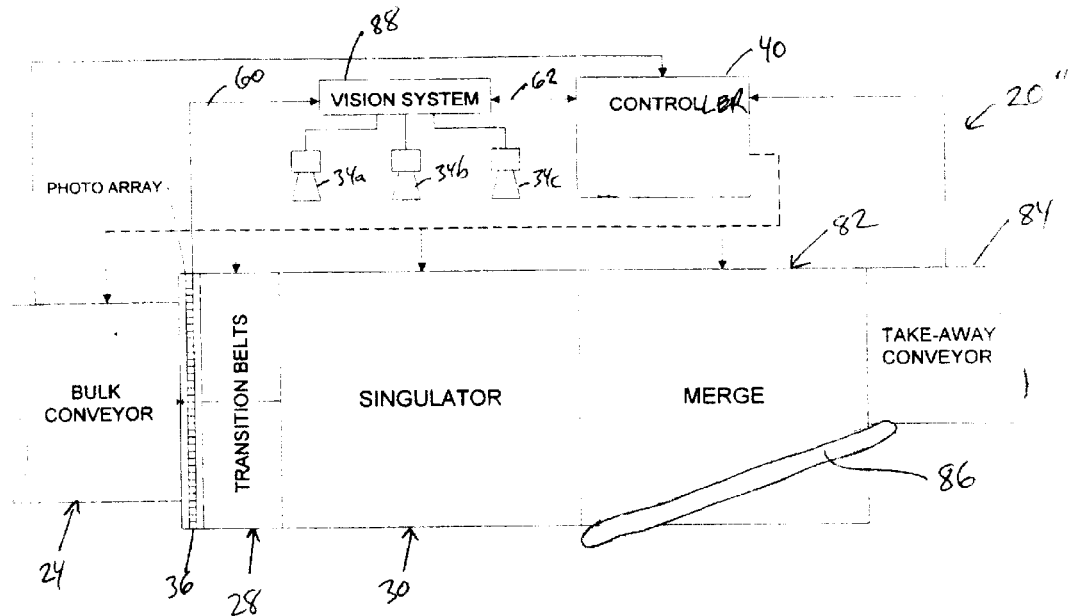
FIG. 18 is a plan view of an article manipulation system according to another embodiment of the invention.
Figure 19:
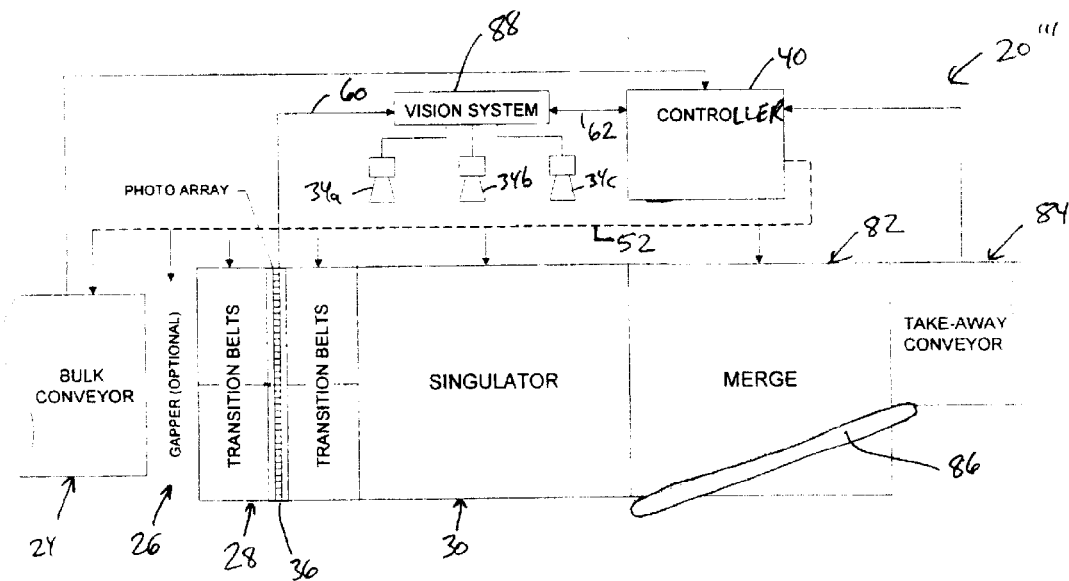
FIG. 19 is a plan view of an article manipulation system according to yet another embodiment of the present invention.

FIGS. 18 and 19 depict two alternative implementations of an article manipulation system according to the present invention. In the embodiment of FIG. 18, the article manipulation system 20" includes a bulk conveyor 24, photo-sensor array 36, transition conveyor 28, manipulation bed 82, merge conveyor 82, and take-away conveyor 84. Article manipulation system 20" does not include a gapper 26. Photo-sensor array 36 is positioned at an upstream end of transition conveyor 28, rather than in a center region of conveyor 28. Merge conveyor 82 may include a merge bar 86 that is angled with respect to the direction of conveyance. Merge bar 86 causes articles traveling on merge conveyor 82 that come into contact with it to be pushed toward the side of conveyor 82 that is aligned with take-away conveyor 84. Merge conveyor 82 thus does not need to use wheels, or other types of actuators, to merge incoming article streams into exiting article streams having a smaller lateral expanse.

Article manipulation system 20" may further include a vision processor 88 that is discrete from controller 40. Processor 88 may pre-process the raw signals received from cameras 34 and/or sensor array 36 before passing the sensed information onto controller 40. Processor 88 may include any suitable microprocessor and associated hardware components.

Article manipulation system 20''' of FIG. 19 includes the same components as article manipulation system 20", and further includes a gapper 26. Photo-sensor array 36 is positioned in the center region of transition conveyor 28. Article manipulation system 20''' includes a merge conveyor 82 that may be the same as the merge conveyor 82 of article manipulation system 20".

While the present invention has been described in terms of several preferred embodiments depicted in the drawings and discussed in the above specification, it will be understood by one skilled in the art that the present invention is not limited to these particular embodiments, but includes any and all such modifications that are within the spirit and scope of the present invention as defined in the appended claims.

The invention claimed is:

1. A system for manipulating articles generally traveling in a direction of conveyance comprising:
   a bed comprising a plurality of conveyor groups, each said conveyor group being generally aligned with each other in the direction of conveyance and each said conveyor group comprising a plurality of individual conveyors positioned side-by-side in a direction transverse to the direction of conveyance, said conveyors at least partially supporting articles traveling thereon and moving the articles in the direction of conveyance, said individual conveyors comprising belt conveyors;
   at least one sensor determining the position of the articles traveling over said plurality of conveyor groups; and
   a controller in communication with said at least one sensor and said conveyors, said controller manipulating articles traveling on said bed by controlling the speed of said conveyors, said controller further selectively rotating an article positioned on said bed by controlling the speed of selected ones of the conveyors underneath the article such that at least a first one of said selected ones of said conveyors has a different speed than a second one of said selected conveyors.

2. The system of claim 1 wherein said controller further causes at least one other article on said bed to move in the direction of conveyance while an article is being rotated on said bed.

3. The system of claim 1 wherein said controller selectively rotates an article generally about a center of the article.

4. The system of claim 1 wherein the speed of said selected ones of said conveyors is set generally as a function of a distance of said selected ones of said conveyor to a point on the article.

5. The system of claim 4 wherein said point on the article is an intended point of rotation of the article.

6. The system of claim 4 wherein said point on the article is substantially at a center of gravity of the article.

7. The system of claim 1 further including a flow-splitter positioned adjacent to a downstream end of said bed, said flow-splitter steering articles exiting said bed to one of a plurality of downstream conveyors.

8. The system of claim 7 wherein said flow-splitter comprises a plurality of powered, steerable wheels that define a conveying surface.

9. The system of claim 1 wherein said controller further determines if two articles having overlapping alignment in a transverse direction on said bed are on opposite sides of a dividing line extending in the direction of conveyance, said transverse direction extending in a direction transverse to the direction of conveyance, said controller causing said two articles to exit said bed during at least one coincident moment in time if said two articles are on opposite sides of said dividing line.

10. The system of claim 9 wherein said dividing line is positioned generally at a center of said bed.

11. The system of claim 1 wherein said controller further determines if two articles on said bed meet the conditions of:
  (i) said two articles having overlapping alignment in a direction transverse to the direction of conveyance and being on opposite sides of a dividing line extending in the direction of conveyance; or
  (ii) one or both of said two articles can be rotated before exiting said bed such that said two articles will have overlapping transverse alignment on opposite sides of said dividing line after rotation;
  said controller causing in said two articles to exit during at least one coincident moment in time if either of conditions (i) or (ii) are met.

12. The system of claim 11 wherein said dividing line is positioned generally at a center of said bed.

13. The system of claim 1 wherein said conveyors are direct-driven belt conveyors.

14. The system of claim 1 wherein said at least one sensor comprises at least one video camera positioned above said bed.

15. The system of claim 1 wherein said at least one sensor includes at least one array of photo-sensors oriented to emit and detect signals traveling generally in a vertical direction, said signals being obstructed by articles traveling past said array.

16. The system of claim 1 further including a gapping mechanism positioned upstream of said bed, said gapping mechanism moving articles traveling thereon further apart in a direction transverse to the direction of conveyance.

17. The system of claim 16 further including a transition belt positioned adjacent a downstream end of said gapping mechanism, said transition belt operating at a speed such that articles traveling from said gapping mechanism to said transition belt are moved further apart in a direction parallel to the direction of conveyance.

18. The system of claim 1 further including a transition belt upstream of said bed, said transition belt substantially continuously feeding said bed articles to be manipulated.

19. The system of claim 1 wherein said controller is adapted to separate a batch of articles.

20. The system of claim 1 wherein said controller is singulates articles.

21. A method of manipulating articles, comprising:
  providing a bed having at least one conveying surface adapted to move articles in a direction of conveyance from an upstream end to a downstream end of said bed, said at least one conveying surface comprising a plurality of side-by-side belt conveyors;
  providing at least one sensor and using said at least one sensor to determine the position of any articles on said bed during at least one moment in time;
  selecting an article on said bed to be manipulated;
  determining whether said selected article is to be rotated;
  moving said selected article in the direction of conveyance at a speed generally higher than other articles traveling on said bed that have yet to be manipulated by driving ones of said belt conveyors conveying said selected article at a speed that is higher than the speed of others of said belt conveyors conveying said other articles; and
  if said article is to be rotated, rotating the selected article by driving said ones of said conveyor belts at different speeds from each other.

22. The method of claim 21 including simultaneously moving at least an upstream portion of said conveying surface such that one or more articles can be received at an upstream end of said bed while said selected article is being rotated.

23. The method of claim 21 wherein said bed comprises a plurality of conveyor groups, each said conveyor group being generally aligned with each other in the direction of conveyance and each said conveyor group comprising a plurality of individual conveyors positioned side-by-side in a direction transverse to the direction of conveyance.

24. The method of claim 23 wherein said individual conveyors are direct-driven belt conveyors.

25. The method of claim 21 further comprising substantially continuously feeding articles to said bed.

26. The method of claim 25 further comprising manipulating articles.

27. The method of claim 21 further comprising feeding articles to said bed in a batch.

28. The method of claim 27 further comprising separating articles from a batch.

29. The method of claim 21 comprising rotating the selected article generally about a center of the article.

30. The method of claim 21 further comprising determining if two articles having overlapping alignment in a transverse direction on said bed are on opposite sides of a dividing line extending in the direction of conveyance, said transverse direction extending in a direction transverse to the direction of conveyance; and
  moving said conveying surface such that said two articles exit said bed during at least one coincident moment in time if said two articles are on opposite sides of said dividing line.

31. The method of claim 21 further comprising determining if two articles on said bed meet the conditions of:
  (i) said two articles having overlapping alignment in a direction transverse to the direction of conveyance and being on opposite sides of a dividing line extending in the direction of conveyance; or
  (ii) one or both of said two articles can be rotated before exiting said bed such that said two articles will have overlapping transverse alignment and be on opposite sides of said dividing line after rotation; and
  moving said conveying surface such that the two articles exit said bed during at least one coincident moment in time if either of conditions (i) or (ii) are met.

32. A system for manipulating articles generally traveling in a direction of conveyance comprising:
  a bed comprising a plurality of conveyor groups, said conveyor group being generally aligned with each other in the direction of conveyance and each said conveyor group comprising a plurality of individual conveyors positioned side-by-side in a direction transverse to the direction of conveyance, said conveyors at least partially supporting articles traveling thereon and moving the articles in the direction of conveyance, said conveyors comprising belt conveyors;
  at least one sensor determining the position of the articles traveling over said plurality of conveyor groups; and a controller in communication with said at least one sensor and said conveyors, said controller selectively rotating an article traveling on said bed by controlling the speed of said conveyors, said controller further controlling the speed of said conveyors at more than two different non-zero speeds.

33. The system of claim 32 further including a transition belt upstream of said bed, said transition belt substantially continuously feeding said bed articles to be manipulated.

34. The system of claim 32 wherein said controller selectively rotates an article positioned on said bed by controlling the speed of selected ones of the conveyors underneath the article such that at least a first one of said selected ones of said conveyors has a different speed than a second one of said selected conveyors.

35. The system of claim 32 wherein said controller determines if two articles have overlapping alignment in a transverse direction on said bed are on opposite sides of a dividing line extending in the direction of conveyance, said transverse direction extending in a direction transverse to the direction of conveyance, said controller causing said two articles to exit a downstream end of said bed during at least one coincident moment in time if said two articles are on opposite sides of said dividing line.

36. An article manipulation bed, comprising:
a plurality of conveyor groups, said conveyor groups being generally aligned with each other in a direction of conveyance and each of said conveyor groups comprising a plurality of conveyor units positioned side-by-side in a direction transverse to the direction of conveyance;
each of said conveyor units comprising a first conveyor belt reeved at least partially around at least two first idler rollers, said first conveyor belt moving articles carried thereon in a direction of conveyance;
each of said conveyor units further comprising a second conveyor belt reeved at least partially around at least two second idler rollers, said second conveyor belt moving articles carried thereon in said direction of conveyance, said second conveyor belt being positioned alongside said first conveyor belt;
each of said conveyor units further comprising a first assembly having a first drive roller about which said first conveyor belt is at least partially reeved and a first motor driving said first conveyor belt, said first drive roller and said first motor rotatable about a common first axis; and each of said conveyor units further comprising a second assembly having a second drive roller about which said second conveyor belt is at least partially reeved and a second motor driving said second conveyor belt, said second drive roller and said second motor rotatable about a common second axis;
wherein said first and second axes are not collinear with respect to each other in a direction transverse to the direction of conveyance and wherein the motor of one of said first and second assemblies at least partially overlaps the conveyor belt of the other of said first and second assemblies to facilitate close spacing of said first and second conveyor belts; and
a controller, said controller selectively rotating an article traveling on said conveyor group by controlling the speed of said first and second conveyor belts.

37. The manipulation bed of claim 36 wherein said first drive roller is positioned forwardly, in said direction of conveyance, of said second drive roller.

38. The manipulation bed of claim 36 wherein said first motor extending toward said second conveyor belt in a direction transverse to the direction of conveyance, and said second motor extending toward said first conveyor belt in a direction transverse to the direction of conveyance.

39. The manipulation bed of claim 36 wherein said upstream end rollers of said first and second conveyor or belts are aligned with each other in a direction transverse to the direction of conveyance, and said downstream end rollers of said first and second conveyor belts are aligned with each other in a direction transverse to the direction of conveyance.

40. The manipulation bed of claim 36 wherein each of said conveyor units further comprising a first tensioning roller in contact with said first conveyor belt and a second tensioning roller in contact with said second conveyor belt.

41. The manipulation bed of claim 40 wherein each of said conveyor units further comprising a first tensioning spring for biasing said first tensioning roller and a second tensioning spring for biasing said second tensioning roller.

42. The manipulation bed of claim 36 wherein each of said conveyor units further comprising a support plate between said first and second conveyor belts for supporting said first and second idler rollers and said first and second drive rollers.

* * * * *

UNITED STATES PATENT AND TRADEMARK OFFICE
CERTIFICATE OF CORRECTION

| | | |
|---|---|---|
| PATENT NO. | : 7,090,067 B2 | Page 1 of 1 |
| APPLICATION NO. | : 10/605670 | |
| DATED | : August 15, 2006 | |
| INVENTOR(S) | : Ricardo N. Schiesser and Michele Vitalini | |

It is certified that error appears in the above-identified patent and that said Letters Patent is hereby corrected as shown below:

Column 1:
Line 5, "APPLICATIONS" should be --APPLICATION--.
Line 12, Insert --THE-- before "INVENTION".

Column 2:
Line 18, Insert --THE-- before "INVENTION".

Column 3:
Line 61, Insert --THE-- before "DRAWINGS".

Column 17:
Line 22, Claim 11, Delete "in" after "causing".
Line 52, Claim 20, Delete "is" after "controller".

Column 20:
Line 26, Claim 39, Delete "or" after "conveyor"

Signed and Sealed this

Sixth Day of February, 2007

JON W. DUDAS
*Director of the United States Patent and Trademark Office*